US011775384B2

(12) United States Patent
Kanno

(10) Patent No.: US 11,775,384 B2
(45) Date of Patent: Oct. 3, 2023

(54) MEMORY SYSTEM

(71) Applicant: Kioxia Corporation, Tokyo (JP)

(72) Inventor: Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 77 days.

(21) Appl. No.: 17/470,521

(22) Filed: Sep. 9, 2021

(65) Prior Publication Data

US 2022/0300373 A1 Sep. 22, 2022

(30) Foreign Application Priority Data

Mar. 19, 2021 (JP) ................................. 2021-045504

(51) Int. Cl.

*G06F 11/10* (2006.01)
*G06F 11/07* (2006.01)
*G06F 12/14* (2006.01)
*G06F 12/02* (2006.01)

(52) U.S. Cl.

CPC ........ *G06F 11/1068* (2013.01); *G06F 11/076* (2013.01); *G06F 11/0772* (2013.01); *G06F 11/1004* (2013.01); *G06F 12/0246* (2013.01); *G06F 12/1408* (2013.01); *G06F 2212/1032* (2013.01); *G06F 2212/7201* (2013.01)

(58) Field of Classification Search

CPC ............... G06F 11/1068; G06F 11/076; G06F 11/0772; G06F 11/1004; G06F 12/0246; G06F 12/1408; G06F 2212/1032; G06F 2212/7201

USPC ........ 714/764, 763, 768, 773, 785, 799, 800

See application file for complete search history.

(56) References Cited

U.S. PATENT DOCUMENTS

| | | | | |
|---|---|---|---|---|
| 8,364,886 | B2 | 1/2013 | Goss | |
| 9,191,030 | B2 * | 11/2015 | Sakata | H03M 13/29 |
| 9,547,566 | B2 * | 1/2017 | Nakanishi | G11C 11/00 |
| 11,221,789 | B2 * | 1/2022 | Yamanaka | G06F 3/0602 |
| 2007/0204199 | A1 * | 8/2007 | Chung | G06F 11/08 714/763 |
| 2013/0173986 | A1 * | 7/2013 | Sakata | G06F 11/1004 714/755 |
| 2015/0331742 | A1 * | 11/2015 | Liang | G06F 11/1076 714/764 |
| 2015/0378818 | A1 * | 12/2015 | Tsern | H04L 1/08 714/764 |
| 2016/0188399 | A1 * | 6/2016 | Benedict | G06F 11/0721 714/819 |
| 2018/0159558 | A1 * | 6/2018 | Cha | H03M 13/09 |
| 2018/0329766 | A1 * | 11/2018 | Nagashima | G06F 12/1408 |
| 2020/0089430 | A1 | 3/2020 | Kanno | |
| 2020/0192800 | A1 | 6/2020 | Biles et al. | |

(Continued)

FOREIGN PATENT DOCUMENTS

JP 2020-46963 A 3/2020

*Primary Examiner* — John J Tabone, Jr.

(74) *Attorney, Agent, or Firm* — Oblon, McClelland, Maier & Neustadt, L.L.P.

(57) ABSTRACT

In general, according to one embodiment, a memory system includes: a memory; and a memory controller including an error detection code circuit configured to generate a first error detection code from first data and generate a second error detection code from second data containing the first error detection code. The memory controller is configured to: convert the first data and the second error detection code by a first method and generate third data; and write the third data into the memory.

20 Claims, 22 Drawing Sheets

(56) References Cited

U.S. PATENT DOCUMENTS

| | | | | |
|---|---|---|---|---|
| 2021/0049064 | A1* | 2/2021 | Liang | G06F 3/065 |
| 2021/0294691 | A1* | 9/2021 | Matsubara | G06F 11/1004 |
| 2022/0300373 | A1* | 9/2022 | Kanno | G06F 11/076 |

* cited by examiner

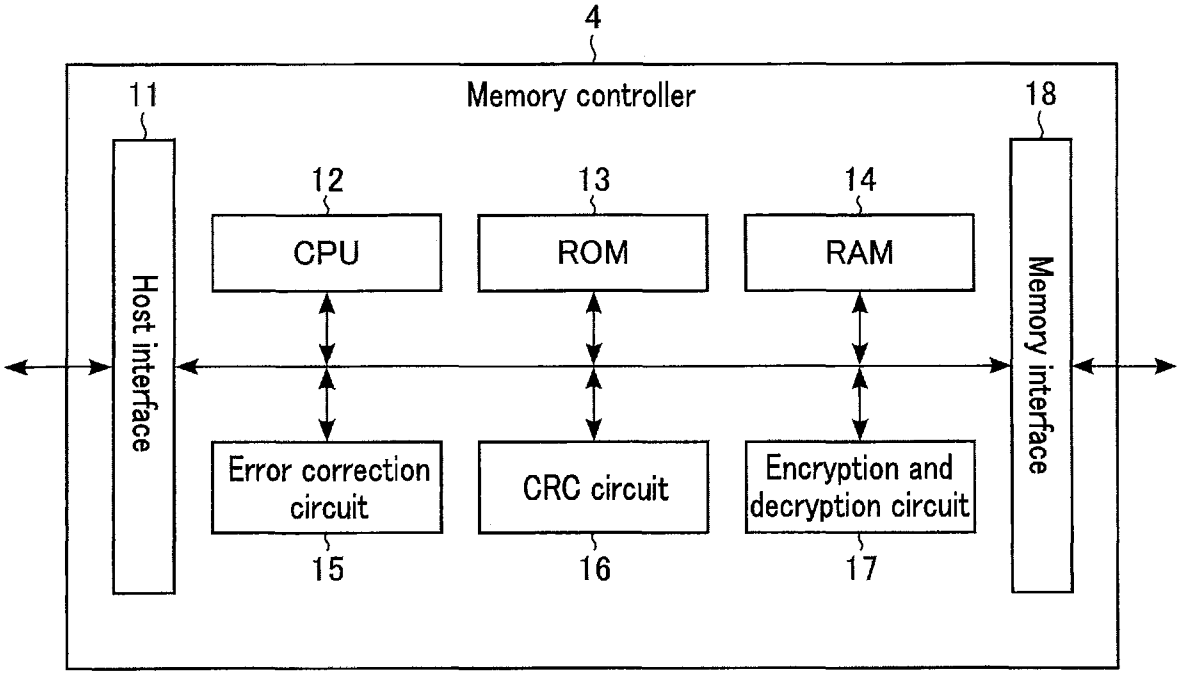
F I G. 2

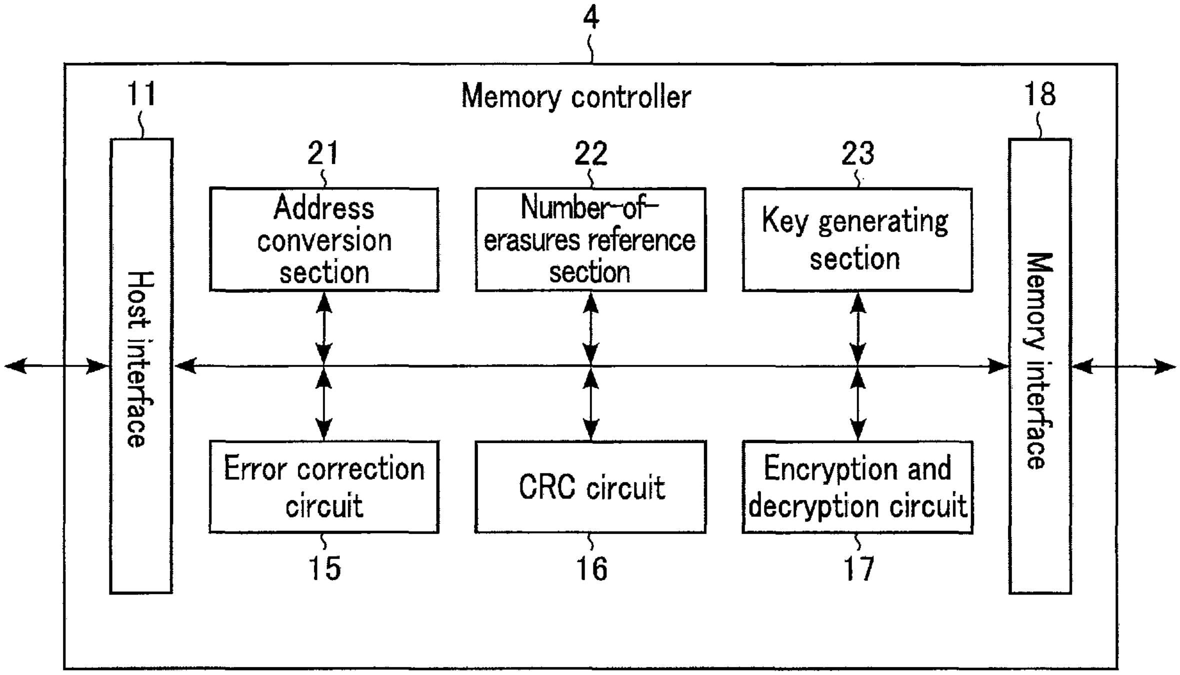
F I G. 3

31

| Logical address | Physical (block) address |
|---|---|
| 0000 - 0FFF | 0001 |
| 1000 - 1FFF | 0005 |
| 2000 - 2FFF | 0100 |
| 3000 - 3FFF | 0A00 |
| | |
| 4000 - 4FFF | 0003 |
| 5000 - 5FFF | 0123 |
| 0000 - 0FFF | 0124 |
| ⋮ | ⋮ |

| Physical (block) address | Number of erasures |
|---|---|
| 0000 | E0 |
| 0001 | E1 |
| 0002 | E2 |
| 0003 | E3 |
| 0004 | E4 |
| ⋮ | ⋮ |

FIG. 6

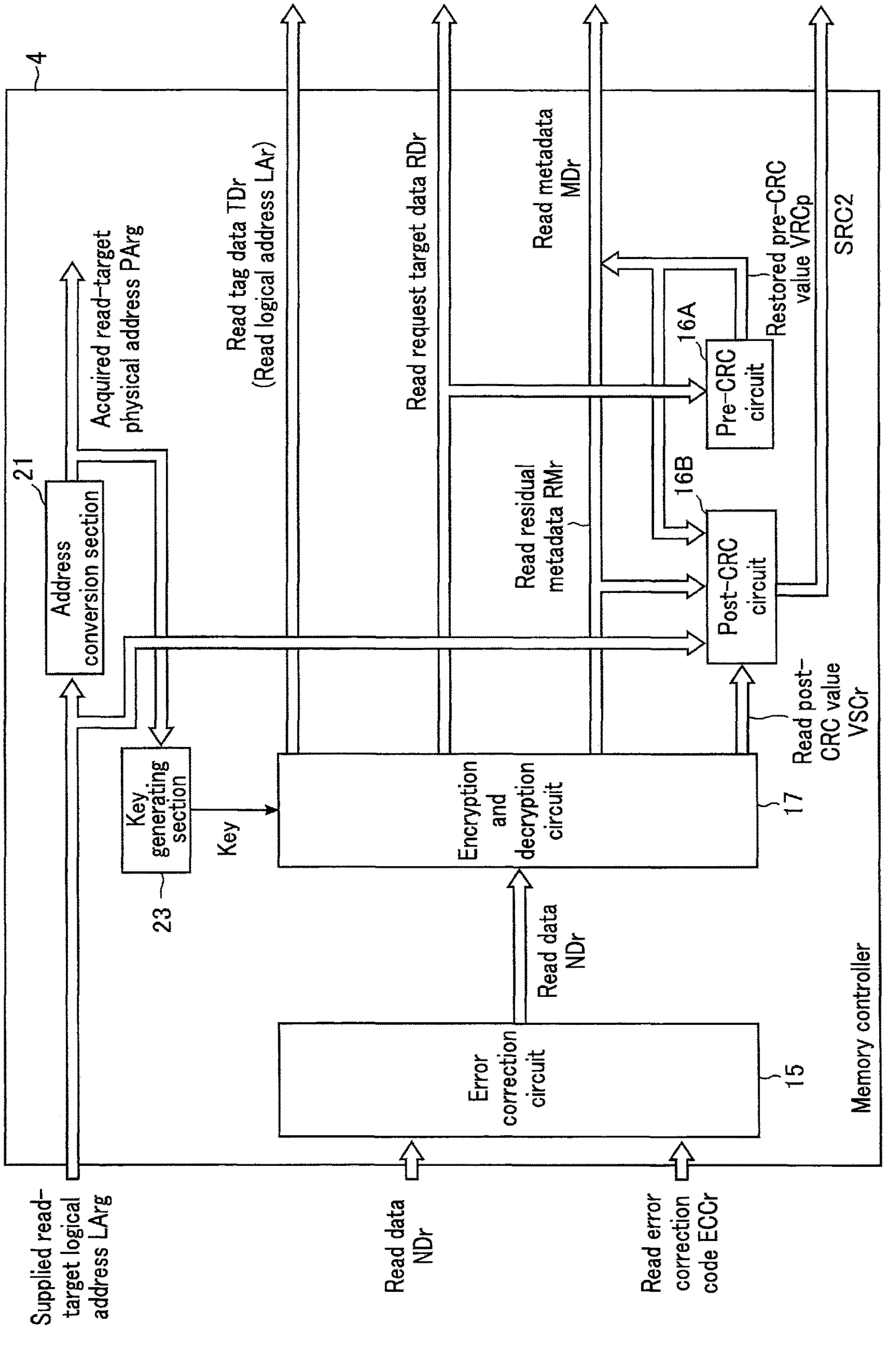
F I G. 9

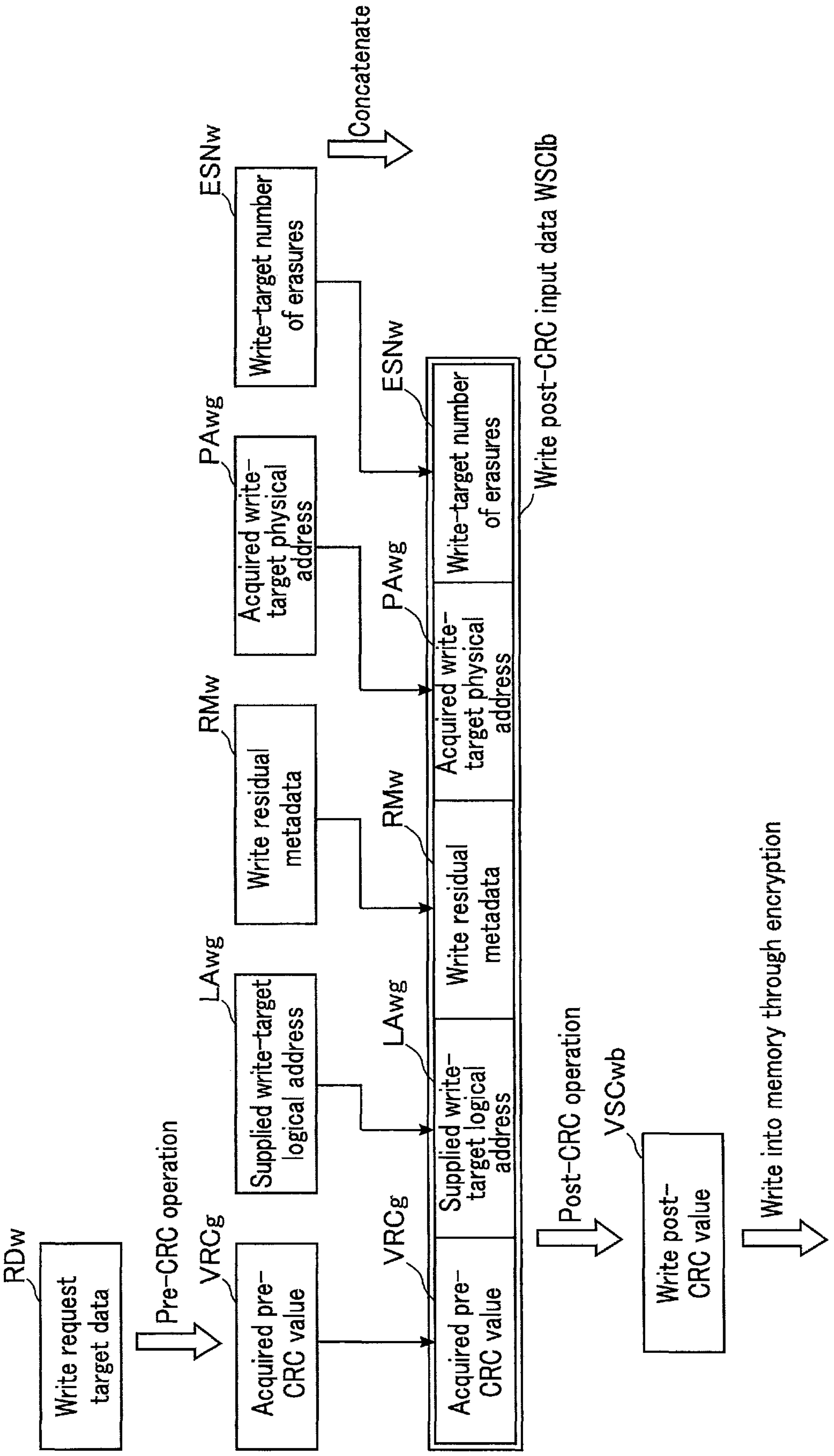
F I G. 16

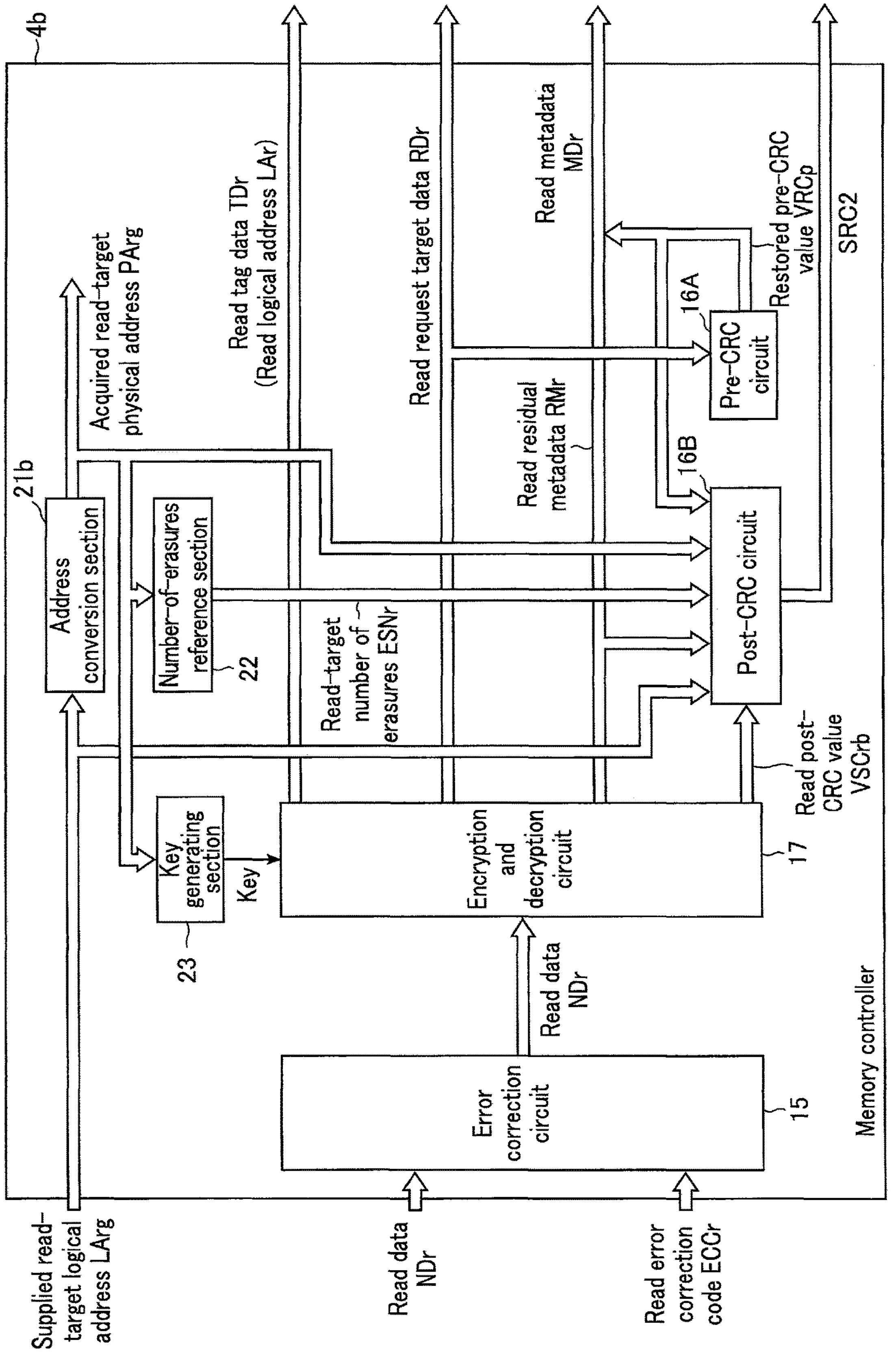
F I G. 17

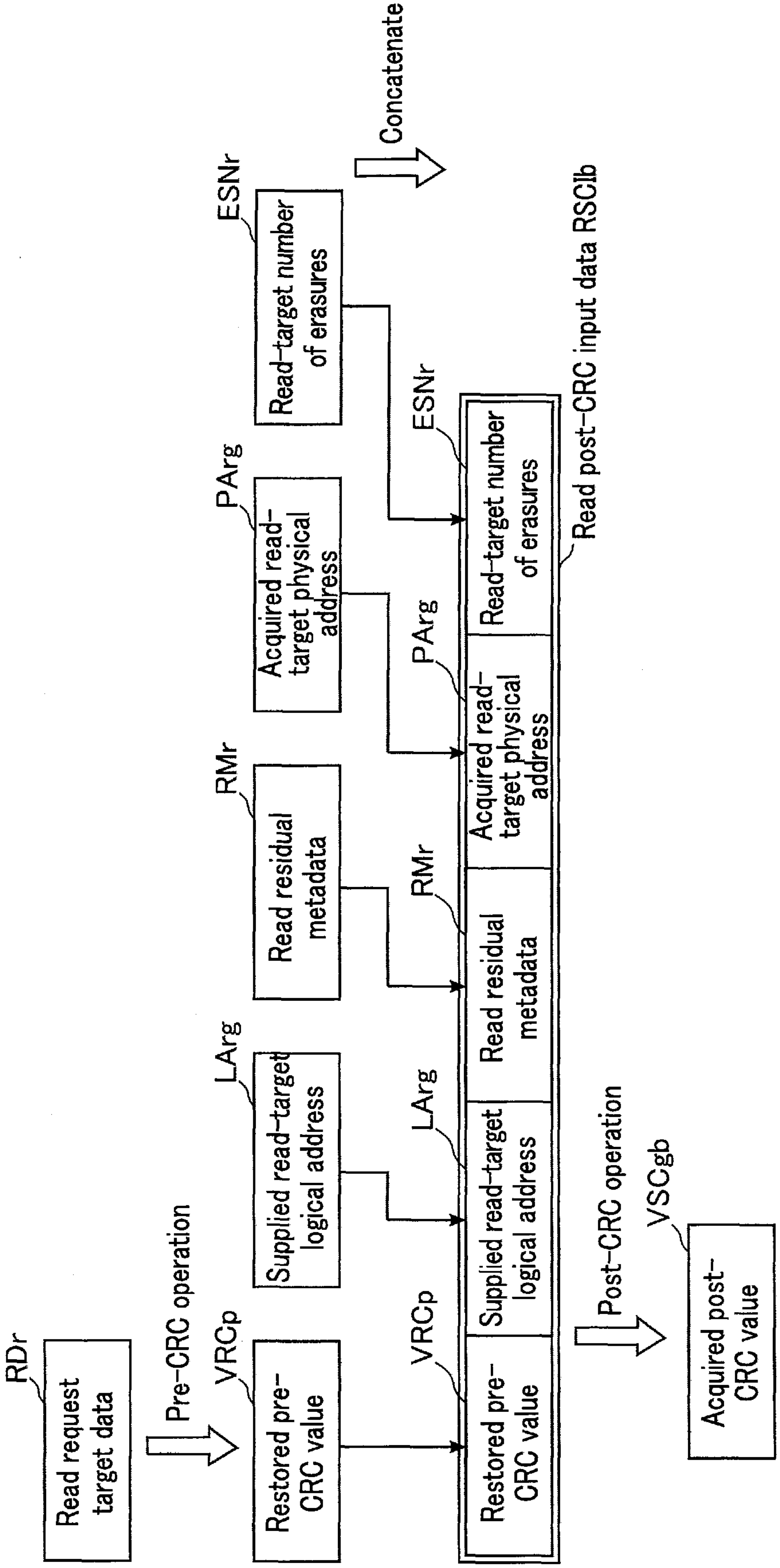
F I G. 18

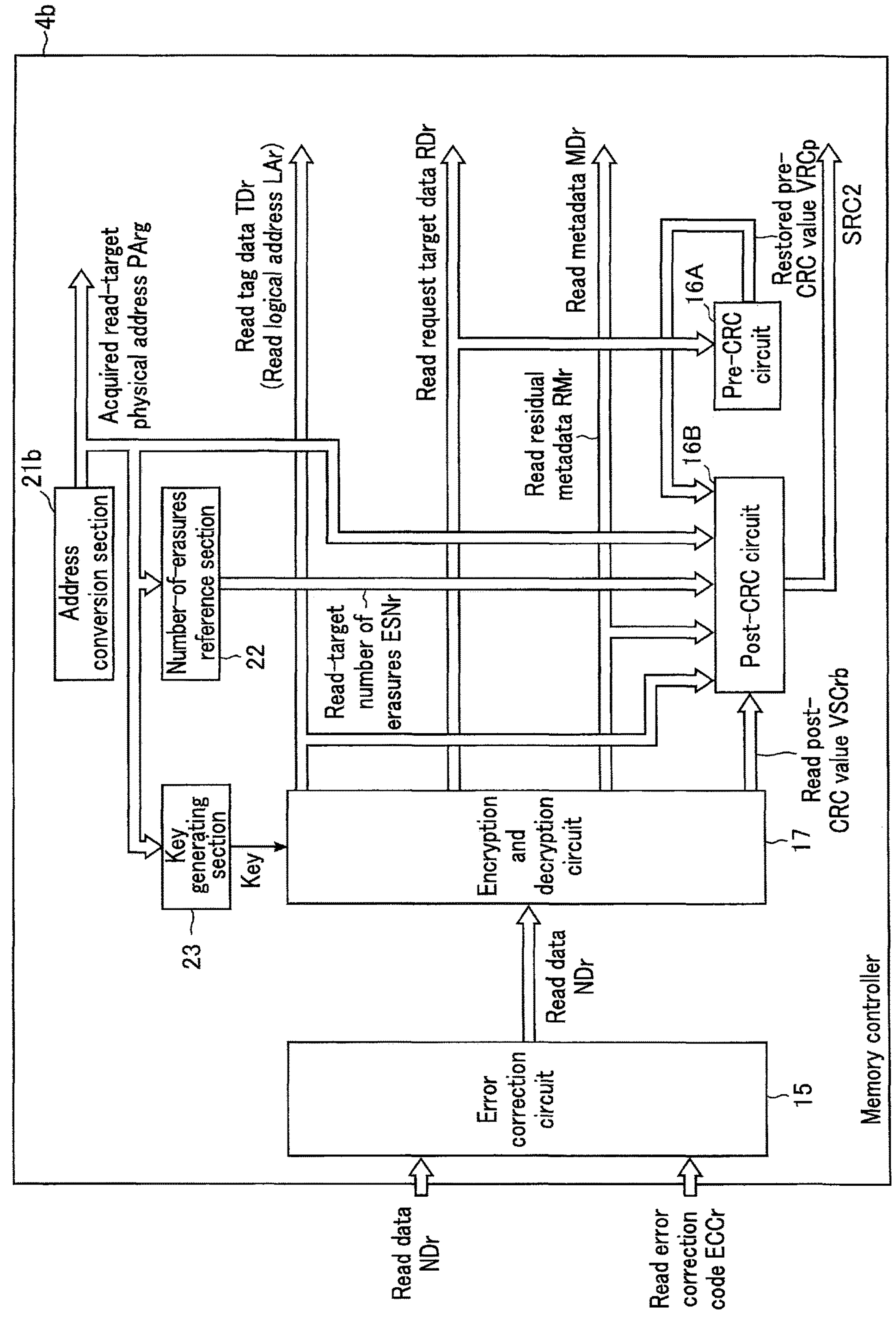
F I G. 19

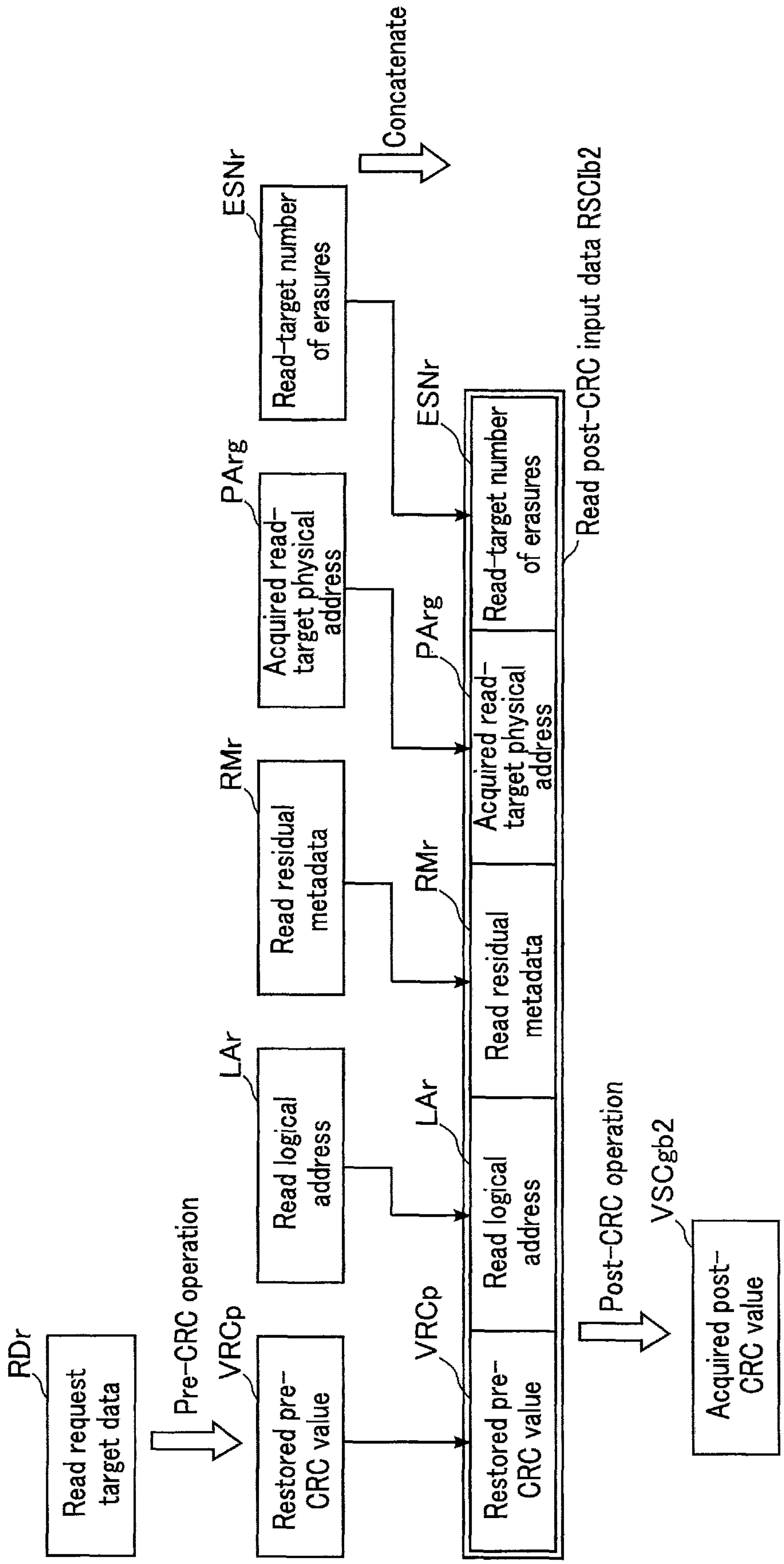
F I G. 21

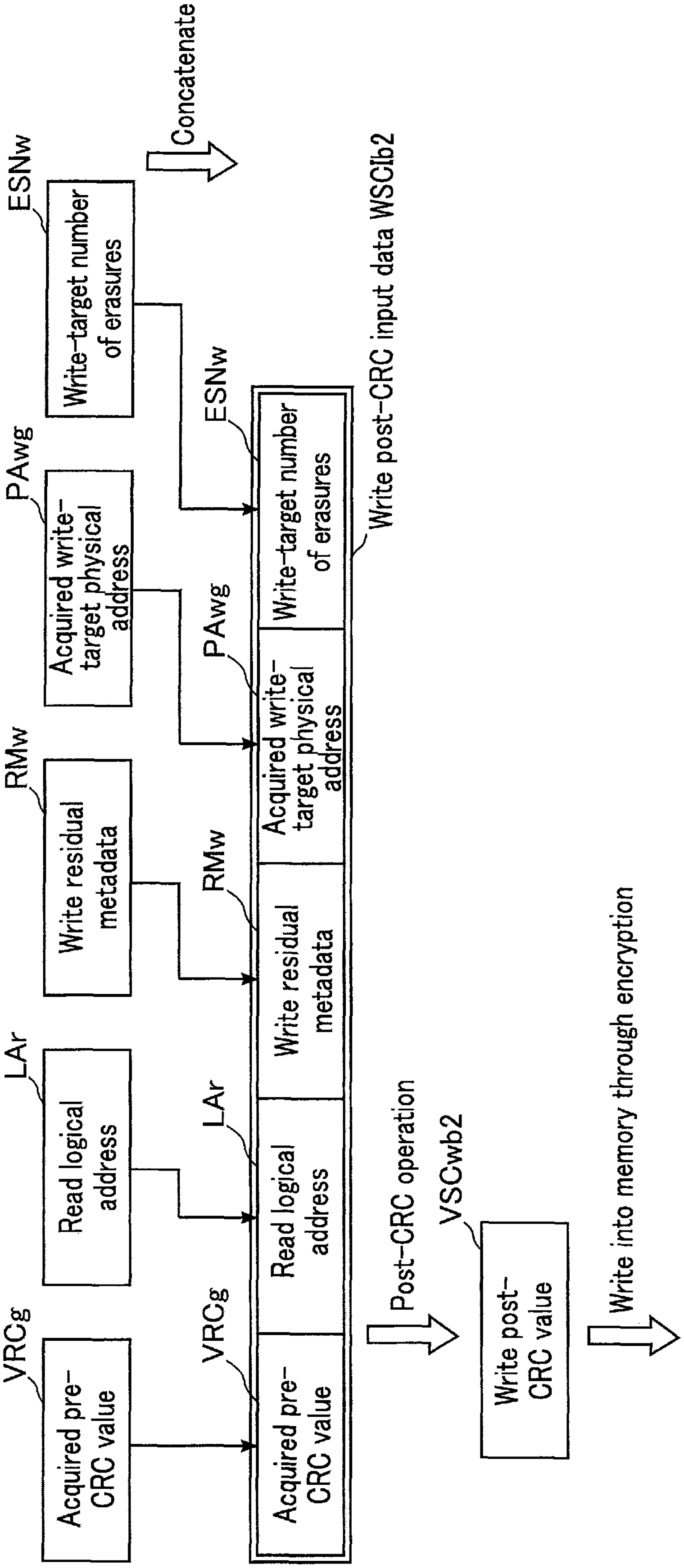
F I G. 22

MEMORY SYSTEM

CROSS-REFERENCE TO RELATED APPLICATIONS

This application is based upon and claims the benefit of priority from Japanese Patent Application No. 2021-045504, filed Mar. 19, 2021, the entire contents of which are incorporated herein by reference.

FIELD

Embodiments described herein relate generally to a memory system.

BACKGROUND

A memory system including a memory and a controller that controls the memory is known. Such a memory system stores data based on an instruction from a host device, and reads data based on an instruction from the host device. The memory system may use a NAND flash memory as a memory.

BRIEF DESCRIPTION OF THE DRAWINGS

FIG. 2 shows a hardware configuration of a memory controller according to the first embodiment.

FIG. 3 shows a functional block configuration of the memory controller according to the first embodiment.

FIG. 5 shows an example of an address conversion table according to the first embodiment.

FIG. 6 shows an example of a number-of-erasures table according to the first embodiment.

FIG. 9 shows a flow of data based on a data read request from the host device in the memory system according to the first embodiment.

FIG. 16 shows some CRC values acquired and generated during data writing in the memory system according to the second embodiment.

FIG. 17 shows a flow of data based on a data read request from the host device in the memory system according to the second embodiment.

FIG. 18 shows some CRC values acquired and generated during data writing in the memory system according to the second embodiment.

FIG. 19 shows a flow of data in data copying in the memory system according to the second embodiment.

FIG. 21 shows some CRC values acquired and generated during data copying in the memory system according to the second embodiment.

FIG. 22 shows some CRC values acquired and generated during data copying in the memory system according to the second embodiment.

DETAILED DESCRIPTION

Figure 1:
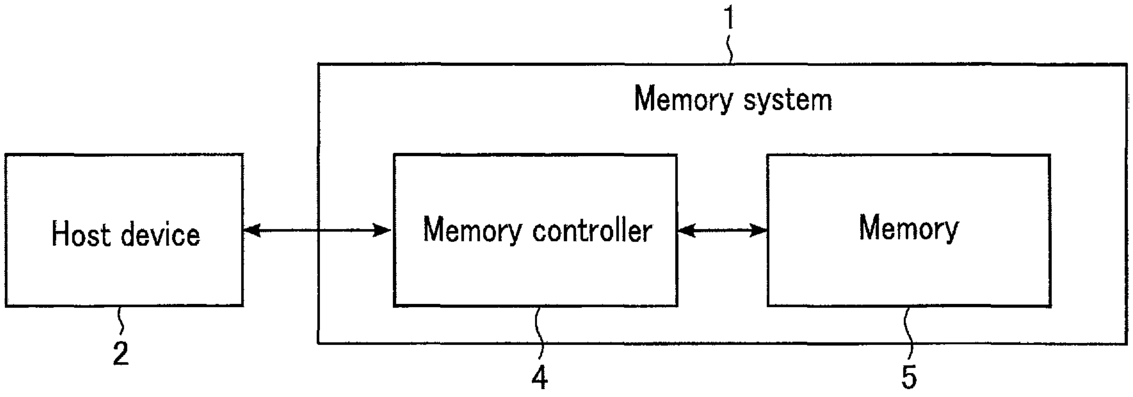
FIG. 1 shows an example of a configuration of an information processing system according to a first embodiment.

In general, according to one embodiment, a memory system includes: a memory; and a memory controller including an error detection code circuit configured to generate a first error detection code from first data and generate a second error detection code from second data containing the first error detection code. The memory controller is configured to: convert the first data and the second error detection code by a first method and generate third data; and write the third data into the memory.

Embodiments will now be described with reference to the figures. In the following description, components with substantially the same functionalities and configurations will be referred to with the same reference numerals, and repeated descriptions may be omitted. In order to distinguish components having substantially the same function and configuration from each other, an additional numeral or letter may be added to the end of each reference numeral.

The entire description of a particular embodiment also applies to other embodiments unless explicitly mentioned otherwise or obviously excluded.

1. First Embodiment

1.1. Configuration

FIG. 1 shows an example of a configuration of an information processing system according to a first embodiment. As shown in FIG. 1, the information processing system includes a memory system 1 and a host device 2. Examples of the host device 2 include a personal computer, a portable information terminal, and a server.

Upon receiving an order to process data from the host device 2, the memory system 1 performs various processes, such as data storage and data reading, based on the received order. A processing order from the host device 2 may be hereinafter referred to as a "request" or a "host request". Examples of the memory system 1 include a solid-state drive (SSD) and memory cards of various types.

The memory system 1 includes a memory 5 and a memory controller 4. The memory 5 non-volatilely stores data. The memory 5 is, for example, a semiconductor chip. The memory 5 may include a plurality of semiconductor chips. The memory 5 writes data only in an area from which data has been erased, in other words, in an area in which data is not yet written. The memory 5 is, for example, a NAND flash memory. The description given below is based on an example in which the memory 5 is a NAND flash memory.

Of the entire memory area provided by the memory 5, the memory 5 writes data in units of areas of a certain size. The unit by which data is written may be referred to as a "storage unit". When the memory 5 is a NAND flash memory, the storage unit is a page.

Of the entire memory area provided by the memory 5, the memory 5 erases data in units of areas of a certain size. The unit by which data is erased may be hereinafter referred to as an erasure unit. The erasure unit is a set of a plurality of storage units. When the memory 5 is a NAND flash memory, the erasure unit is a block, and each block consists of a plurality of pages.

The memory controller 4 controls the memory 5 so as to perform a process indicated by the request from the host device 2. Also, the memory controller 4 may autonomously control the memory 5 without being based on a request. The memory controller 4 is, for example, a semiconductor chip. The memory controller 4 is, for example, a system on a chip (SoC).

1.1.2. Configuration of Memory Controller

FIG. 2 shows a hardware configuration of the memory controller according to the first embodiment. As shown in FIG. 2, the memory controller 4 includes a host interface 11, a central processing unit (CPU) 12, a read-only memory (ROM) 13, a random access memory (RAM) 14, an error correction circuit 15, a cyclic redundancy check (CRC) circuit 16, an encryption and decryption circuit 17, and a memory interface 18. The host interface 11, the CPU 12, the ROM 13, the RAM 14, the error correction circuit 15, the CRC circuit 16, the encryption and decryption circuit 17, and the memory interface 18 are mutually coupled via a bus.

The host interface 11 is an interface for communicating with the host device 2, and may be configured of hardware, or a combination of hardware and software. The host interface 11 is compliant with a communication standard, and is coupled to the host device 2 and is capable of communicating with the host device 2 according to the communication standard with which it is compliant. That is, both the host device 2 and the host interface 11 are compliant with a communication standard, and communicate according to the communication standard with which they are compliant, and can be coupled via a cable that enables communications according to the communication standard with which they are compliant. The communication standard that is employed defines at least transmission of user data and appendix data. The user data is data that is desired to be stored by a user of the information processing system. The appendix data contains information on the user data and data to be used for storage and reading of the user data. Examples of the appendix data include tag data and metadata. The tag data transmits a tag. The tag is additional information associated with the user data. The metadata is information regarding the user data. Examples of the communication standard that is employed include Serial Advanced Technology Attachment (SATA), Serial Attached Small (SAS) computer system interface, and Non-Volatile Memory express (NVMe).

The ROM 13 is a non-volatile memory. Examples of the ROM 13 include an electrically erasable programmable read-only memory (EEPROM). The ROM 13 stores, for example, a program including firmware.

The RAM 14 is a volatile memory. Examples of the RAM 14 include a dynamic random-access memory (DRAM) and a static random-access memory (SRAM). The RAM 14 temporarily stores data. The RAM 14 can function as a buffer memory and a work area. While, for example, the memory system 1 is being supplied with a power supply, a program stored in the ROM 13 is loaded on the RAM 14.

The CPU 12 is a processor, and controls the entire operation of the memory controller 4. Through execution of programs stored in the ROM 13 and loaded onto the RAM 14 by the CPU 12, the memory controller 4 executes various operations. Firmware is configured to allow the CPU 12 to perform operations described as embodiments.

The error correction circuit 15 may be implemented as an independent and dedicated semiconductor chip, may be a circuit formed on a semiconductor substrate, or may be implemented through execution of firmware by the CPU 12. The error correction circuit 15 detects and corrects an error in data written into and read from the memory 5 through the use of an error correction code (ECC). The error correction circuit 15 generates an error correction code based on data written into the memory 5 (or, substantial write data). Based on the scheme of generating the error correction code, redundant data generated from the substantial write data (or, error correction code) is added to the substantial write data. The error correction circuit 15 generates an error correction code for each section of data of a given size received by the error correction circuit 15. The substantial write data and the error correction code generated from the substantial write data is written into the memory 5. The error correction circuit 15 detects an error in the data read from the memory 5 through the use of the error correction code, and attempts to correct an error if any error is detected.

The CRC circuit 16 may be implemented as an independent and dedicated semiconductor chip, may be a circuit formed on a semiconductor substrate, or may be implemented through execution of firmware by the CPU 12, for example. The CRC circuit detects an error in data transmitted and received between the memory system 1 and the host device 2 through the use of a CRC and a generator polynomial. The CRC circuit 16 generates check data by dividing the received data by one or more predetermined generator polynomials. The check data is a remainder obtained by a division by a generator polynomial.

The CRC circuit 16 is capable of generating second check data by dividing, by a generator polynomial, the value of data obtained by concatenating (or, connecting) first check data obtained in the course of a division of the value of first data received by the CRC circuit 16 by a generator polynomial and second data received by the CRC circuit 16. Generating the first check data from the first data may be hereinafter referred to as a "pre-CRC operation". Generating the second check data from the second data may be hereinafter referred to as a "post-CRC operation".

The encryption and decryption circuit 17 may be implemented as an independent and dedicated semiconductor chip, may be a circuit formed on a semiconductor substrate, or may be implemented through execution of firmware by the CPU 12. The encryption and decryption circuit 17 encrypts data written into the memory 5 using a key (or, encryption key). The encryption and decryption circuit 17 decrypts data read from the memory 5 using a key (or, decryption key). The encryption may include scrambling, and the decryption may include descrambling.

The memory interface 18 is an interface for communicating with the memory 5, and may be configured of hardware, or a combination of hardware and software. The memory interface 18 is capable of communicating with the memory 5 according to a scheme compliant with the type of the memory 5. The memory interface 18 is coupled to the memory 5 via an interconnect that allows for communications according to a scheme compliant with the type of the memory 5, to enable communications according to the scheme compliant with the type of the memory 5. According to an example in which the memory 5 is a NAND flash memory, the memory interface 18 is a NAND interface, and signals are transmitted and received according to a NAND interface.

1.1.2.1. Functional Block Configuration of Memory Controller

FIG. 3 shows a functional block configuration of the memory controller 4 according to the first embodiment. Each functional block can be implemented in the form of hardware, computer software, or a combination thereof, unless otherwise expressly or implicitly excluded, or expressly specified. The functional blocks are not necessarily separated as in the following example. For example, some of the functions may be executed by a functional block different from the functional block to be described as an example. In addition, the functional blocks to be described as an example may be divided into smaller functional sub-blocks.

As shown in FIG. 3, the memory controller 4 includes a host interface 11, a CRC circuit 16, an error correction circuit 15, an encryption and decryption circuit 17, a memory interface 18, an address conversion section 21, a number-of-erasures reference section 22, and a key generating section 23.

The address conversion section 21, the number-of-erasures reference section 22, and the key generating section 23 can be implemented through execution of programs stored in the ROM 13 and loaded onto the RAM 14 by the CPU 12, and by part of the RAM 14.

The address conversion section 21 manages correspondence between the logical address and the physical address in the memory system 1, as will be described below.

The host device 2 divides a memory space provided by the memory system 1 into a plurality of logical areas, assigns a unique logical address to each logical area, and manages the memory space of the memory system 1 using the logical address. Upon determining that write-target data is stored in a logical area, the host device 2 assigns the determined logical address to the write target data. Thereafter, the host device 2 requests the memory system 1 to write the write target data into a logical area specified by the logical address.

On the other hand, the memory controller 4 manages the memory space of the memory 5 using an address system different from that of the logical address. That is, the memory space provided by the memory 5 is assigned an address in a system different from that of the logical address. An address that specifies a memory area in the memory 5 is referred to as a physical address. The memory controller 4 writes data into the memory 5 and reads data from the memory 5 using the physical address.

The address conversion section 21 manages correspondence between the logical address and the physical address. Any unit may be used as the physical address. When the memory 5 is a NAND flash memory, an address of a block (or, information that uniquely defines a block) can be used as the physical address.

The number-of-erasures reference section 22 manages, with respect to each erasure unit (i.e., block), the number of times data has been erased in the erasure unit. The number of erasures does not revert to values that have been reached previously, unless the memory system 1 is reset or initialized. The number of erasures may be, for example, the number of erasures from when the memory system 1 is first powered on until when the memory system 1 is reset or initialized.

The key generating section 23 generates an encryption key and a decryption key. The key generating section 23 is capable of generating an encryption key and a decryption key using at least a physical address.

1.1.2.2. CRC Circuit

Figure 4:
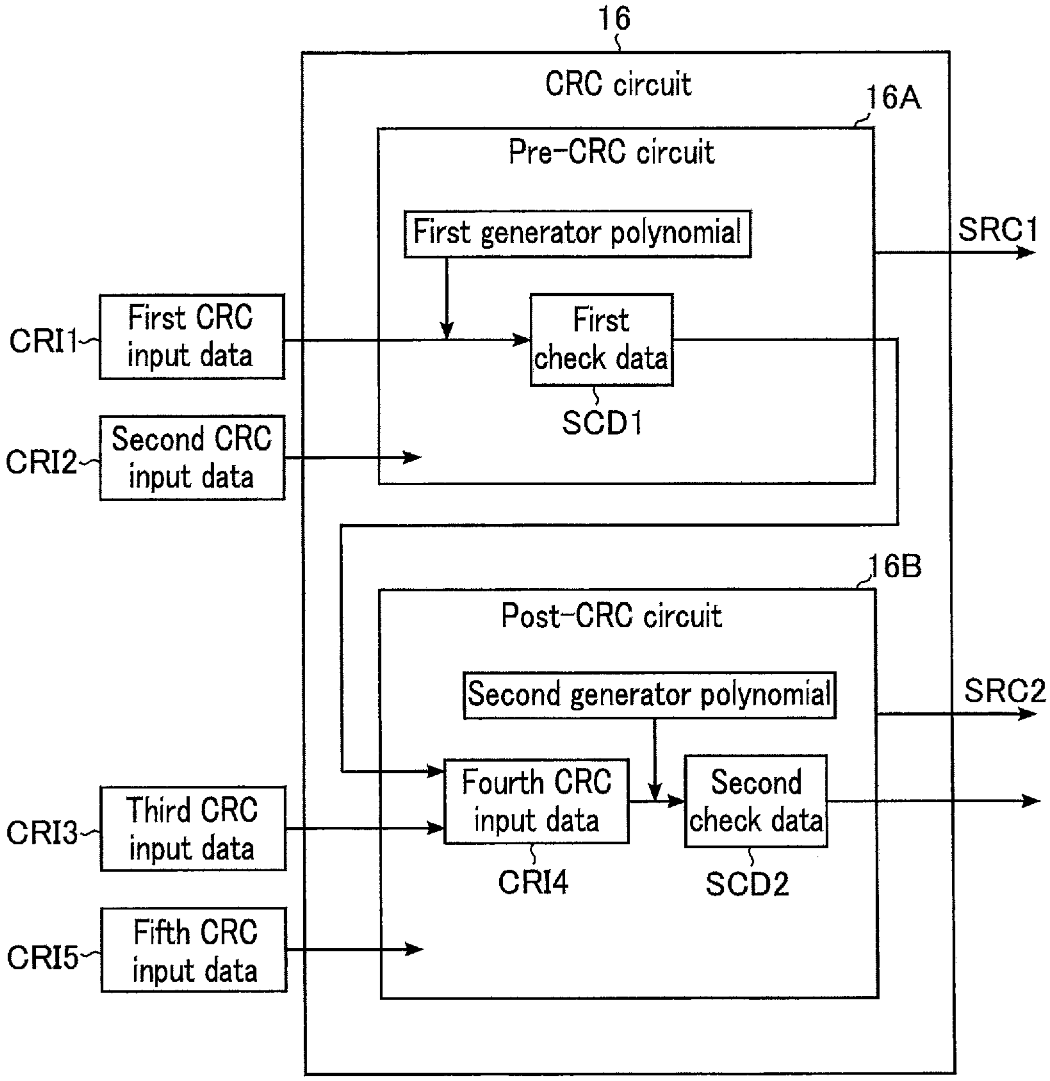
FIG. 4 shows a configuration example of a cyclic redundancy check (CRC) circuit according to the first embodiment.

FIG. 4 shows a configuration example of the CRC circuit 16 according to the first embodiment.

As described above, the CRC circuit 16 performs a pre-CRC operation and a post-CRC operation.

As shown in FIG. 4, the CRC circuit 16 includes two sub CRC circuits. A first sub CRC circuit is referred to as a "pre-CRC circuit 16A", and is used for the pre-CRC operation. A second sub CRC circuit is referred to as a post-CRC circuit 16B, and is used for a post-CRC operation.

The pre-CRC circuit 16A receives first CRC input data CRI1 from outside the pre-CRC circuit 16A. The pre-CRC circuit 16A divides the first CRC input data CRI1 by a first generator polynomial. By the division, a remainder is obtained. The pre-CRC circuit 16A acquires the remainder of the division as first check data SCD1.

The pre-CRC circuit 16A receives second CRC input data CRI2 from outside the pre-CRC circuit 16A. The pre-CRC circuit 16A compares the value of the first check data SCD1 and the value of the second CRC input data CRI2. If the value of the first check data SCD1 and the value of the second CRC input data CRI2 match, the pre-CRC circuit 16A outputs a signal SRC1 indicating the match. If the value of the first check data SCD1 and the value of the second CRC input data CRI2 do not match, the pre-CRC circuit 16A outputs a signal SRC1 indicating the mismatch.

The pre-CRC circuit 16A outputs the first check data SCD1. The first check data SCD1 is received by the post-CRC circuit 16B. The post-CRC circuit 16B receives third CRC input data CRI3 from outside the post-CRC circuit 16B. The post-CRC circuit 16B concatenates the first check data SCD1 and the third CRC input data CRI3 to acquire fourth CRC input data CRI4. The post-CRC circuit 16B divides the value of the fourth CRC input data CRI4 by a second generator polynomial. The second generator polynomial may be the same as or different from the first generator polynomial. By the division, a remainder is obtained. The post-CRC circuit 16B acquires the remainder of the division as second check data SCD2. The post-CRC circuit 16B may output the second check data SCD2 based on the process being executed.

The post-CRC circuit 16B receives fifth CRC input data CRI5 from outside the post-CRC circuit 16B. The post-CRC circuit 16B compares the value of the second check data SCD2 and the value of the fifth CRC input data CRI5. If the value of the second check data SCD2 and the value of the fifth CRC input data CRI5 match, the post-CRC circuit 16B outputs a signal SRC2 indicating the match. If the value of the second check data SCD2 and the value of the fifth CRC input data CRI5 do not match, the post-CRC circuit 16B outputs a signal SRC2 indicating the mismatch.

1.2. Operation 1.2.1. Table Storage by RAM

While the memory system 1 is ON with a supply from a power source, the memory controller according to the first embodiment stores some tables on, for example, the RAM 14. Such tables include an address conversion table 31 and a number-of-erasures table 32. The address conversion table 31 is stored in the address conversion section 21. The number-of-erasures table 32 is stored in the number-of-erasures reference section 22.

FIG. 5 shows an example of the address conversion table 31 according to the first embodiment. The address conversion table 31 includes a plurality of sets of data items associated with each other, as shown in FIG. 5. The address conversion table 31 includes a plurality of entries. Each entry includes a logical address and a physical address associated with the logical address.

A physical address included in an entry specifies, of the memory area of the memory 5, an area that stores data assigned the logical address included in the entry.

FIG. 6 shows an example of the number-of-erasures table 32 according to the first embodiment. The number-of-erasures table 32 includes a plurality of sets of data items associated with each other, as shown in FIG. 6. The number-of-erasures table 32 includes a plurality of entries. Each entry includes a physical address that specifies an erasure unit (i.e., block) and the number of erasures for the block specified by the physical address.

1.2.2. Data Handling Process in Memory 1.2.2.1. Data Writing

When the memory controller 4 receives a request to write data assigned a logical address from the host device 2, the memory controller 4 determines an area in which the data which the write request specifies as a target (or, write request target data) is to be written, among areas in the memory 5 in which the data is not yet written. Thereafter, the memory controller 4 writes, in an entry regarding a logical address of the write request target data in the address conversion table 31, a physical address that specifies the determined area in which the data is to be written. The write request target data is encrypted along with management data appended to the write request target data, and is given an error correction code, as will be described later. The encrypted data is written into the memory 5 together with the error correction code generated from the encrypted data.

The memory controller 4 instructs the memory 5 to write the encrypted data and the error correction code into an area specified by the determined physical address.

1.2.2.2. Data Reading

Upon receiving a request to read data assigned a logical address from the host device 2, the memory controller 4 obtains a physical address associated with (or, corresponding to) the logical address of the data which the read request specifies as a target (or, read request target data) with reference to the address conversion table 31. The memory controller 4 instructs the memory 5 to read data from an area specified by the obtained physical address, and acquires the data read from the memory 5. The memory controller 4 detects an error in the data read from the memory 5, corrects an error if any error is detected, decrypts the error-corrected data, and generates read request target data. The read request target data is transmitted to the host device 2.

1.2.2.3. Data Erasure

When the memory controller 4 receives a request to erase data assigned a logical address from the host device 2, the memory controller 4 erases (or, invalidates) data in the physical address associated with the logical address of the data which the erase request specifies as a target (or, erase request target data) in the address conversion table 31. Also, the memory controller 4 increments by one the number of erasures of the physical address associated with the logical address of the erase request target data in the number-of-erasures table 32.

The memory controller 4 may erase data in the data specified by the physical address associated with the logical address of the erase request target data from the memory 5 immediately after receiving the erase request, or may erase such data at a later timing. The erasure timing depends on the design of the memory controller 4 (or, a program that controls the memory controller 4). If erasure is not performed immediately, the erase request target data, which is no longer associated with a logical address, cannot be accessed from the host device 2 but is present in the memory 5. Hereinafter, data that is present in the memory 5 with no association with a logical address may be referred to as "invalid data". On the other hand, data that is stored in the memory 5 with association with a logical address may be referred to as "valid data".

1.2.2.4. Data Update

The memory 5 is capable of writing data into an area in which data is not yet written, and thus cannot overwrite data. On the other hand, there is a case where the memory system 1 receives a request to overwrite data from the host device 2, namely, a request to write, while a data item assigned a logical address is already stored in the memory 5, another data item (hereinafter also referred to as "update data") assigned the same logical address. In this case, the memory controller 4 indirectly executes the overwrite request in the memory system 1 by transmitting, to the memory 5, an order that is compliant with the characteristics of the memory 5. Specifically, the memory controller 4 writes update data into an area which has a physical address and in which data is not yet written. Subsequently, the memory controller 4 updates the physical address associated with a logical address of the overwrite target with a physical address of an area in which the update data is written in the address conversion table 31. The data prior to the update is erased after the update. The erasure timing is not necessarily immediately after the update, and depends on the design of the memory controller 4, similarly to the erasure based on the data erase request.

1.2.3. Operation Based on Write Request

Figure 7:
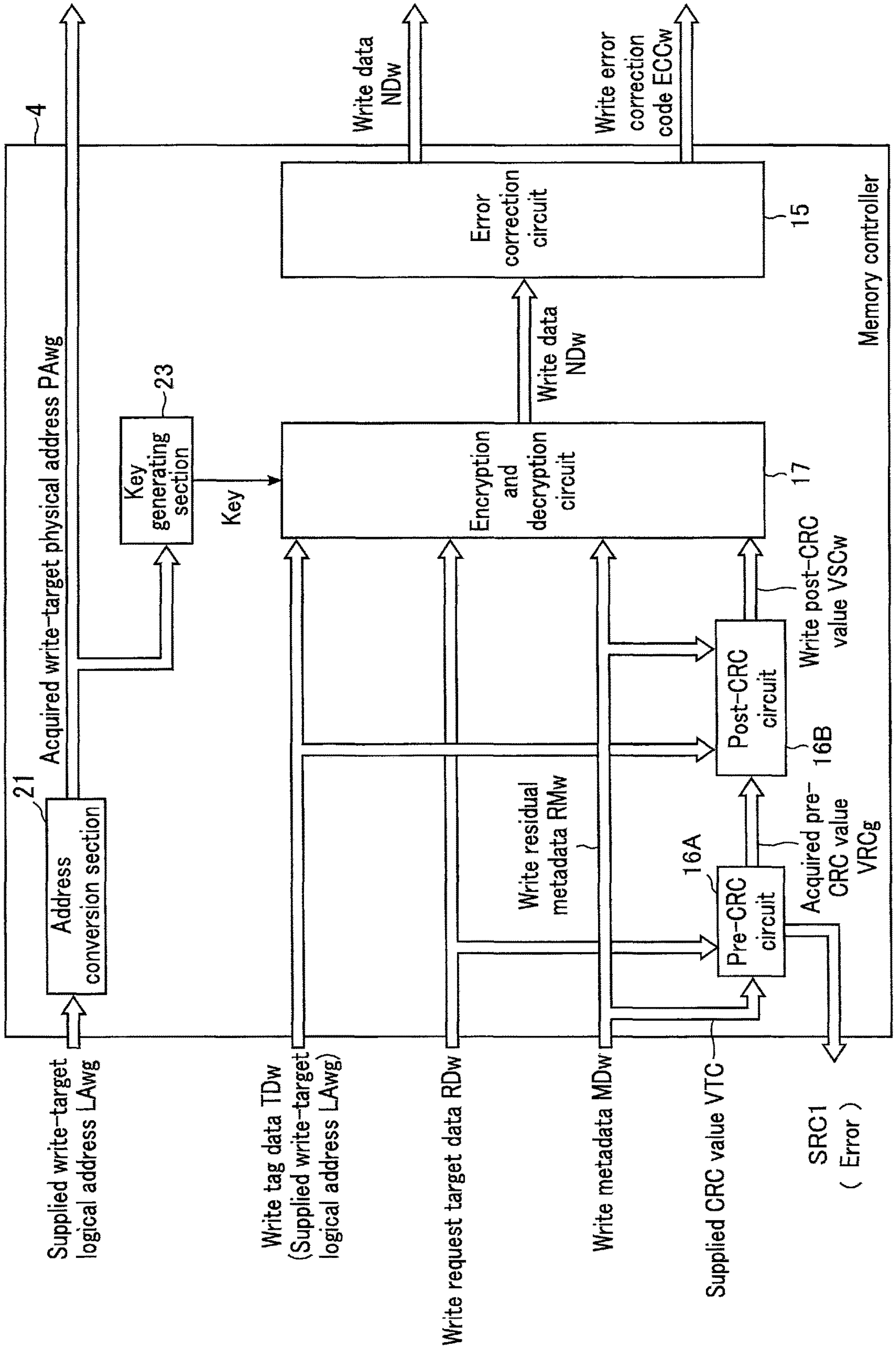
FIG. 7 shows a flow of data based on a data write request from a host device in the memory system according to the first embodiment.

FIG. 7 shows a flow of data based on a data write request from the host device 2 in the memory system 1 according to the first embodiment. More specifically, FIG. 7 shows data received based on a write request, and a change and a flow of the received data. The state shown in FIG. 7 occurs when the memory system 1 receives a command indicating a request to write data (or, write request command) from the host device 2, write request target data, and data associated with the write request target data.

As shown in FIG. 7, the memory system 1 receives, from the host device 2, a write request command (not illustrated), write request target data RDw, write tag data TDw, and write metadata MDw. The write request command includes a logical address of the write request target data RDw. Hereinafter, the logical address of the write request target data RDw may be referred to as a "supplied write-target logical address LAwg".

The supplied write-target logical address LAwg is transmitted by the write tag data TDw.

The write metadata MDw transmits a remainder obtained by a CRC operation based on the first generator polynomial from the write request target data RDw. Hereinafter, a remainder obtained by a CRC operation may be referred to as a "CRC value". The CRC value calculated by the host device 2 from the write request target data RDw and supplied to the memory system 1 may be referred to as a "suppliedCRC value VTC". Of the write metadata MDw, a section excluding the supplied CRC value VTC may be hereinafter referred to as "write residual metadata RMw". The supplied CRC value VTC and the write residual metadata RMw may be transmitted separately. Such a transmission method may occur in the case where the host device 2 and the host interface 11 are compliant with NVMe. In NVMe, the supplied CRC value VTC corresponds to Protect Information (PI).

The write request command, the write request target data RDw, the write tag data TDw, and the write metadata MDw are received by the host interface 11, and are then transferred via a bus to components associated with such data under the control of the CPU 12.

The pre-CRC circuit 16A receives the write request target data RDw. The write request target data RDw corresponds to the first CRC input data CRI1 described with reference to FIG. 4. The pre-CRC circuit 16A generates a remainder of the CRC operation using the first generator polynomial on the value of the write request target data RDw. That is, the pre-CRC circuit 16A performs a pre-CRC operation on the value of the write request target data RDw. A remainder obtained by a pre-CRC operation corresponds to the first check data SCD1 described with reference to FIG. 4. Hereinafter, a remainder obtained by a pre-CRC operation may be referred to as a "pre-CRC value". A pre-CRC value obtained by the write request target data RDw may be referred to as an "acquired pre-CRC value VRCg". The acquired pre-CRC value VRCg corresponds to the first check data SCD1 described with reference to FIG. 4.

The pre-CRC circuit 16A receives the supplied CRC value VTC. The supplied CRC value VTC corresponds to the second CRC input data CRI2 described with reference to FIG. 4. The pre-CRC circuit 16A compares the acquired pre-CRC value VRCg with the supplied CRC value VTC. If the acquired pre-CRC value VRCg and the supplied CRC value VTC do not match, the pre-CRC circuit 16A transmits a signal SRC1 indicating an error to the host device 2 via the host interface 11. When the signal SRC1 indicating the error is transmitted, the process being executed in response to the write request ends. In such a case, the host device 2 is capable of, for example, retransmitting a write request determined as an error and data associated therewith to the memory system 1.

When the acquired pre-CRC value VRCg and the supplied CRC value VTC match, the pre-CRC circuit 16A transmits the acquired pre-CRC value VRCg to the post-CRC circuit 16B. Since the acquired pre-CRC value VRCg is the same as the supplied CRC value VTC, a supplied CRC value VTC may be transmitted.

The supplied write-target logical address LAwg is received by the address conversion section 21. The address conversion section 21 determines a block in the memory 5 into which the write request target data RDw is to be written. The address conversion section 21 writes the physical address of the determined block into an entry of the supplied write-target logical address LAwg in the address conversion table 31. The block into which the write request target data RDw is written may be hereinafter referred to as an "acquired write-target physical address PAwg".

The key generating section 23 generates a key (i.e., encryption key). For the key generation, the key generating section 23 is capable of using, for example, the acquired write-target physical address PAwg.

The post-CRC circuit 16B receives the supplied write-target logical address LAwg included in the write tag data TDw. The post-CRC circuit 16B further receives the acquired pre-CRC value VRCg and write residual metadata RMw. The set of the supplied write-target logical address LAwg and the write residual metadata RMw corresponds to the third CRC input data CRI3 described with reference to FIG. 4.

The post-CRC circuit 16B concatenates the received supplied write-target logical address LAwg, the acquired pre-CRC value VRCg, and the write residual metadata RMw. A bit string formed by concatenation may be hereinafter referred to as "write post-CRC input data WSCI". The write post-CRC input data WSCI corresponds to the fourth CRC input data CRI4 described with reference to FIG. 4. The post-CRC circuit 16B generates a remainder of the CRC operation using the second generator polynomial on the value of the write post-CRC input data WSCI. That is, the post-CRC circuit 16B performs a post-CRC operation on the value of the write post-CRC input data WSCI. A remainder obtained by a post-CRC operation corresponds to the second check data SCD2 described with reference to FIG. 4. Hereinafter, a remainder obtained by a post-CRC operation may be referred to as a "post-CRC value". A post-CRC value obtained from the write request target data RDw may be referred to as a "write post-CRC value VSCw".

The encryption and decryption circuit 17 receives the encryption key, supplied write-target logical address LAwg in the write tag data TDw, write request target data RDw, write residual metadata RMw, and write post-CRC value VSCw. The encryption and decryption circuit 17 encrypts the supplied write-target logical address LAwg in the write tag data TDw, the write request target data RDw, the write residual metadata RMw, and the write post-CRC value VSCw based on the encryption key. By the encryption, write data NDw is obtained. The write data NDw is supplied to the error correction circuit 15.

The error correction circuit 15 generates an error correction code for the write data NDw. The error correction code for the write data NDw may be hereinafter referred to as a "write error correction code ECCw".

The write data NDw and the write error correction code ECCw are received by the memory interface 18. The memory interface 18 writes the write data NDw and the write error correction code ECCw into an area of the memory area of the memory 5 that is specified by the acquired write-target physical address PAwg. That is, the memory interface 18 supplies, to the memory 5, a write command set that instructs writing of the write data NDw, the write error correction code ECCw, the write data NDw, and the write error correction code ECCw into the area specified by the acquired write-target physical address PAwg.

Upon receiving the write data NDw, the write error correction code ECCw, and the write command set, the memory 5 writes the write data NDw into the acquired write-target physical address PAwg.

1.2.3.1. CRC Value Acquired and Generated based on Write Request

Figure 8:
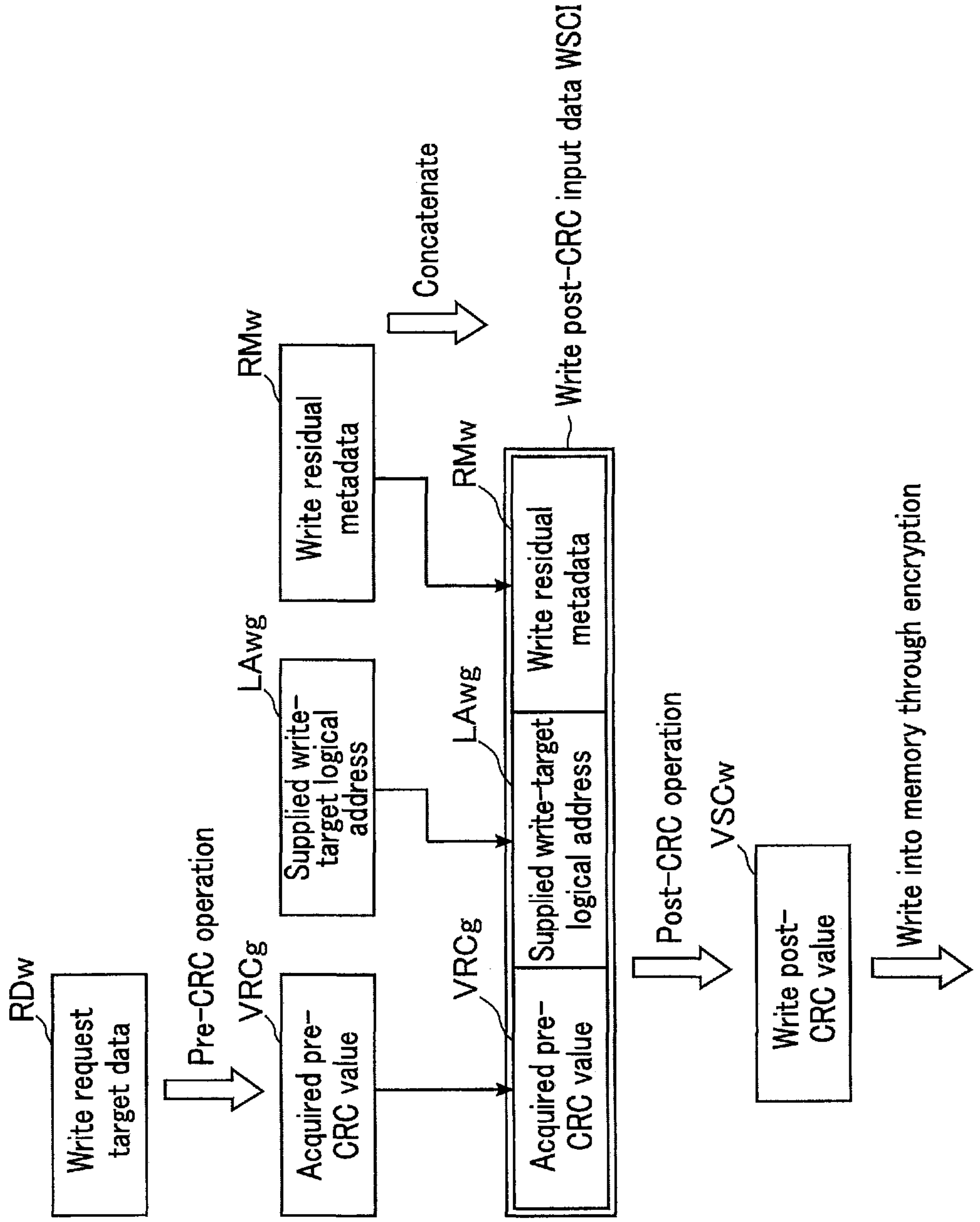
FIG. 8 shows some CRC values acquired and generated during data writing in the memory system according to the first embodiment.

FIG. 8 shows some CRC values acquired and generated during data writing in the memory system 1 according to the first embodiment.

As described with reference to FIG. 7 and as shown in FIG. 8, by dividing the value of the write request target data RDw by the first generator polynomial, namely, by a pre-CRC operation, an acquired pre-CRC value VRCg is generated.

In the post-CRC circuit 16B, the acquired pre-CRC value VRCg is concatenated with the supplied write-target logical address LAwg and the write residual metadata RMw, and thereby write post-CRC input data WSCI is generated. The acquired pre-CRC value VRCg, the supplied write-target logical address LAwg, and the write residual metadata RMw in the write post-CRC input data WSCI may be in any order as long as they are fixed in any concatenation.

By dividing the value of the write post-CRC input data WSCI by the second generator polynomial, namely, by a post-CRC operation, a write post-CRC value VSCw is generated. The write post-CRC value VSCw is generated by using the write post-CRC input data WSCI as a dividend, and the write post-CRC input data WSCI includes the acquired pre-CRC value VRCg and the supplied write-target logical address LAwg. Thus, the write post-CRC value VSCw reflects the acquired pre-CRC value VRCg and the supplied write-target logical address LAwg.

The write post-CRC value VSCw is supplied to the encryption and decryption circuit 17. On the other hand, the acquired pre-CRC value VRCg and the supplied CRC value VTC are not supplied to the encryption and decryption circuit 17. Accordingly, the acquired pre-CRC value VRCg and the supplied CRC value VTC are not included in the write data NDw, and are not written into the memory 5.

1.2.4. Operation Based on Read Request

FIG. 9 shows a flow of data based on a data read request from the host device in the memory system 1 according to the first embodiment. More specifically, FIG. 9 shows data received based on a read request, and a change and a flow of the received data. The state shown in FIG. 9 occurs when the memory system 1 receives a command indicating a data read request (or, read request command) from the host device 2.

The read request command includes a logical address of the read request target data RDr. Hereinafter, the logical address of the read request target data RDr may be referred to as a "supplied read-target logical address LArg". The description given below is based on an example in which the supplied read-target logical address LArg is the same as the supplied write-target logical address LAwg when the read request target data RDr was written.

As shown in FIG. 9, the logical address of the read request target data RDr is received by the address conversion section 21. The address conversion section 21 obtains a physical address associated with the supplied read-target logical address LArg with reference to the address conversion table 31. The physical address associated with the supplied read-target logical address LArg may be hereinafter referred to as an "acquired read-target physical address PArg". The acquired read-target physical address PArg is the same as the acquired write-target physical address PAwg unless an unintentional error occurs during the period from the reception of the data read request until the acquisition of the acquired read-target physical address PArg.

The key generating section 23 generates a key (i.e., decryption key). For the key generation, the key generating section 23 is capable of using, for example, the acquired read-target physical address PArg.

The memory interface 18 reads data from an area of the memory area of the memory 5 that is specified by the acquired read-target physical address PArg. That is, the memory interface 18 supplies a read command set that instructs reading of data from the area specified by the acquired read-target physical address PArg to the memory 5.

Upon receiving the read command set, the memory 5 reads data from the area specified by the acquired read-target physical address PArg, and acquires read data NDr and a read error correction code ECCr. The read data NDr and the read error correction code ECCr are the same as write data NDw written into an area specified by a physical address from which the read data NDr is read and the corresponding write error correction code ECCw unless an unintentional error occurs during the period from the reception of the data read request until the acquisition of the read data NDr and the read error correction code ECCr.

The read data NDr and the read error correction code ECCr are received by the error correction circuit 15. The error correction circuit 15 detects an error in the read data NDr and corrects an error if it contains an error, through the use of a read error correction code ECCr. If the read data NDr does not contain an error, the error correction circuit 15 outputs the received read data NDr. If the read data NDr contains an error and the error is corrected, the error correction circuit 15 outputs read data NDr that does not contain an error.

The read data NDr is received by the encryption and decryption circuit 17. The encryption and decryption circuit 17 receives the decryption key from the key generating section 23. The encryption and decryption circuit 17 decrypts the read data NDr based on the decryption key. If the decryption succeeds, read request target data RDr, a read logical address LAr, read residual metadata RMr, and a read post-CRC value VSCr are obtained. The read request target data RDr, the read logical address LAr, the read residual metadata RMr, and the read post-CRC value VSCr are the same as the write request target data RDw assigned a logical address of the read request target data RDr, the supplied read-target logical address LArg (and the supplied write-target logical address LAwg), the write residual metadata RMw, and the write post-CRC value VSCw, respectively, unless an unintentional error occurs during the period from the reception of the data read request until the end of the decryption.

The read request target data RDr is received by a pre-CRC circuit 16A. The read request target data RDr corresponds to the first CRC input data CRI1 described with reference to FIG. 4. The pre-CRC circuit 16A generates a pre-CRC value by dividing the read request target data RDr by the first generator polynomial. The generated pre-CRC value is referred to as a "restored pre-CRC value VRCp". The restored pre-CRC value VRCp corresponds to the first check data SCD1 described with reference to FIG. 4. The restored pre-CRC value VRCp is the same as the supplied CRC value VTC unless an unintentional error occurs during the period from the reception of the data read request until the acquisition of the restored pre-CRC value VRCp. An CRC operation yields the same CRC value if two bit strings having the same two values are divided by a single generator polynomial. Thus, the restored pre-CRC value VRCp is the same as the supplied CRC value VTC or the acquired pre-CRC value VRCg unless an unintentional error occurs during the period from the reception of the data read request until the acquisition of the restored pre-CRC value VRCp.

The restored pre-CRC value VRCp is received by the post-CRC circuit 16B. The post-CRC circuit 16B also receives the supplied read-target logical address LArg and the read residual metadata RMr. The set of the supplied read-target logical address LArg and the read residual metadata RMr corresponds to the third CRC input data CRI3 described with reference to FIG. 4. The post-CRC circuit 16B acquires read post-CRC input data RSCI by concatenating the restored pre-CRC value VRCp, the supplied read-target logical address LArg, and the read residual metadata RMr. The read post-CRC input data RSCI corresponds to the fourth CRC input data CRI4 described with reference to FIG. 4. The post-CRC circuit 16B generates a post-CRC value by dividing the value of the read post-CRC input data RSCI by the second generator polynomial. The generated post-CRC value is referred to as an "acquired post-CRC value VSCg". The acquired post-CRC value VSCg corresponds to the second check data SCD2 described with reference to FIG. 4.

The post-CRC circuit 16B receives the read post-CRC value VSCr. The read post-CRC value VSCr corresponds to the fifth CRC input data CRI5 described with reference to FIG. 4. The post-CRC circuit 16B compares the acquired post-CRC value VSCg with the read post-CRC value VSCr. The acquired post-CRC value VSCg is the same as the read post-CRC value VSCr. Furthermore, the acquired post-CRC value VSCg is the same as the write post-CRC value VSCw unless an unintentional error occurs during the period from the reception of the data write request until the acquisition of the acquired post-CRC value VSCg. If the acquired post-CRC value VSCg does not match the read post-CRC value VSCr, the post-CRC circuit 16B transmits, via the host interface 11, a signal SRC2 indicating an error to the host device 2. When the signal SRC2 indicating the error is transmitted, the process being executed in response to the read request being executed ends.

If the acquired post-CRC value VSCg matches the read post-CRC value VSCr, the post-CRC circuit 16B transmits a signal SRC2 indicating that the check has been passed to the host interface 11.

Upon receiving the signal SRC2 indicating that the check has been passed, the host interface 11 transmits data to be described below to the host device 2. The host interface 11 transmits the read request target data RDr to the host device 2. The host interface 11 transmits the read logical address LAr to the host device 2 as read tag data TDr. The host interface 11 generates read metadata MDr by concatenating the restored pre-CRC value VRCp and the read residual metadata RMr, and transmits the read metadata MDr to the host device 2.

1.2.4.1. CRC Value Acquired and Generated Based on Read Request

Figure 10:
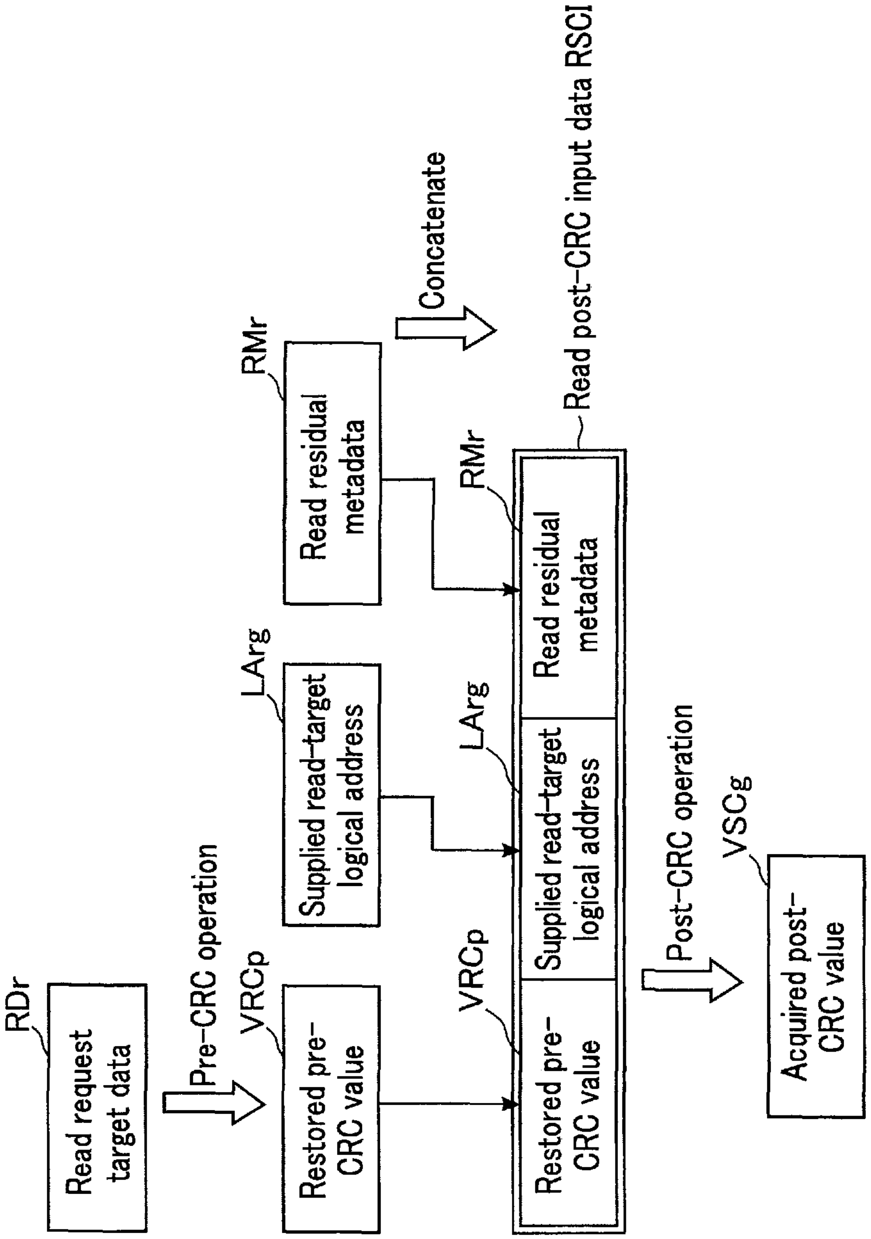
FIG. 10 shows some CRC values acquired and generated during data writing in the memory system according to the first embodiment.

FIG. 10 shows some CRC values acquired and generated during data reading in the memory system 1 according to the first embodiment.

As described with reference to FIG. 9 and as shown in FIG. 10, by dividing the value of the read request target data RDr by the first generator polynomial, namely, by a pre-CRC operation, a restored pre-CRC value VRCp is generated.

In the post-CRC circuit 16B, the restored pre-CRC value VRCp is concatenated with the supplied read-target logical address LArg and the read residual metadata RMr, and thereby read post-CRC input data RSCI is generated. The components that are concatenated in the read post-CRC input data RSCI may be in any order as long as such an order matches the order of corresponding components in the write post-CRC input data WSCI. That is, the restored pre-CRC value VRCp, the supplied read-target logical address LArg, and the read residual metadata RMr respectively correspond to the acquired pre-CRC value VRCg, the supplied write-target logical address LAwg, and the write residual metadata RMw in the write post-CRC input data WSCI. Based thereon, an ordinal rank of the restored pre-CRC value VRCp in the read post-CRC input data RSCI is the same as an ordinal rank of the acquired pre-CRC value VRCg in the write post-CRC input data WSCI. An ordinal rank of the supplied read-target logical address LArg in the read post-CRC input data RSCI is the same as an ordinal rank of the supplied write-target logical address LAwg in the write post-CRC input data WSCI. An ordinal rank of the read residual metadata RMr in the read post-CRC input data RSCI is the same as an ordinal rank of the write residual metadata RMw in the write post-CRC input data WSCI.

By dividing the value of the read post-CRC input data RSCI by the second generator polynomial, namely, by a post-CRC operation, an acquired post-CRC value VSCg is generated.

1.2.5. Data Copying

As described above, the memory system 1 may operate autonomously without receiving a request from the host device 2. Such an operation includes garbage collection. Garbage collection refers to a process for resolving fragmentation in the memory 5. The memory controller 4 may perform garbage collection on an erasure unit (i.e., block) that contains both valid data and invalid data. Through garbage collection, only the valid data is written into a block in which data is not yet written. Details will be described below. The memory controller 4 reads valid data in a physical address of a block that is a target of garbage collection from the memory 5. For the obtained read data, the memory controller 4 regenerates write data through acquisition and comparison of a post-CRC value, similarly to the data reading based on a read request. The user data contained in the obtained write data is the same as the user data contained in the valid data that is a target of garbage collection. The memory controller 4 writes the obtained write data into the memory 5.

Garbage collection includes reading data from an area of the memory 5, and writing the read data into an area of the memory 5 that is different from the read area. The data reading and the data writing are similar to the data writing based on a read request described with reference to FIG. 9 and the data writing based on a write request described with reference to FIG. 7. In garbage collection, updating (or, overwriting) of data with a logical address does not occur. Instead, a physical address of an area that stores data assigned a logical address may change. Thus, the data writing and the data reading are not based on a request from the host device 2. In this respect, the data reading and the data writing differ between the case of being based on a request from the host device 2 and the case of being performed in garbage collection. Accordingly, a supplied read-target logical address LArg does not exist in data reading in garbage collection.

Figure 11:
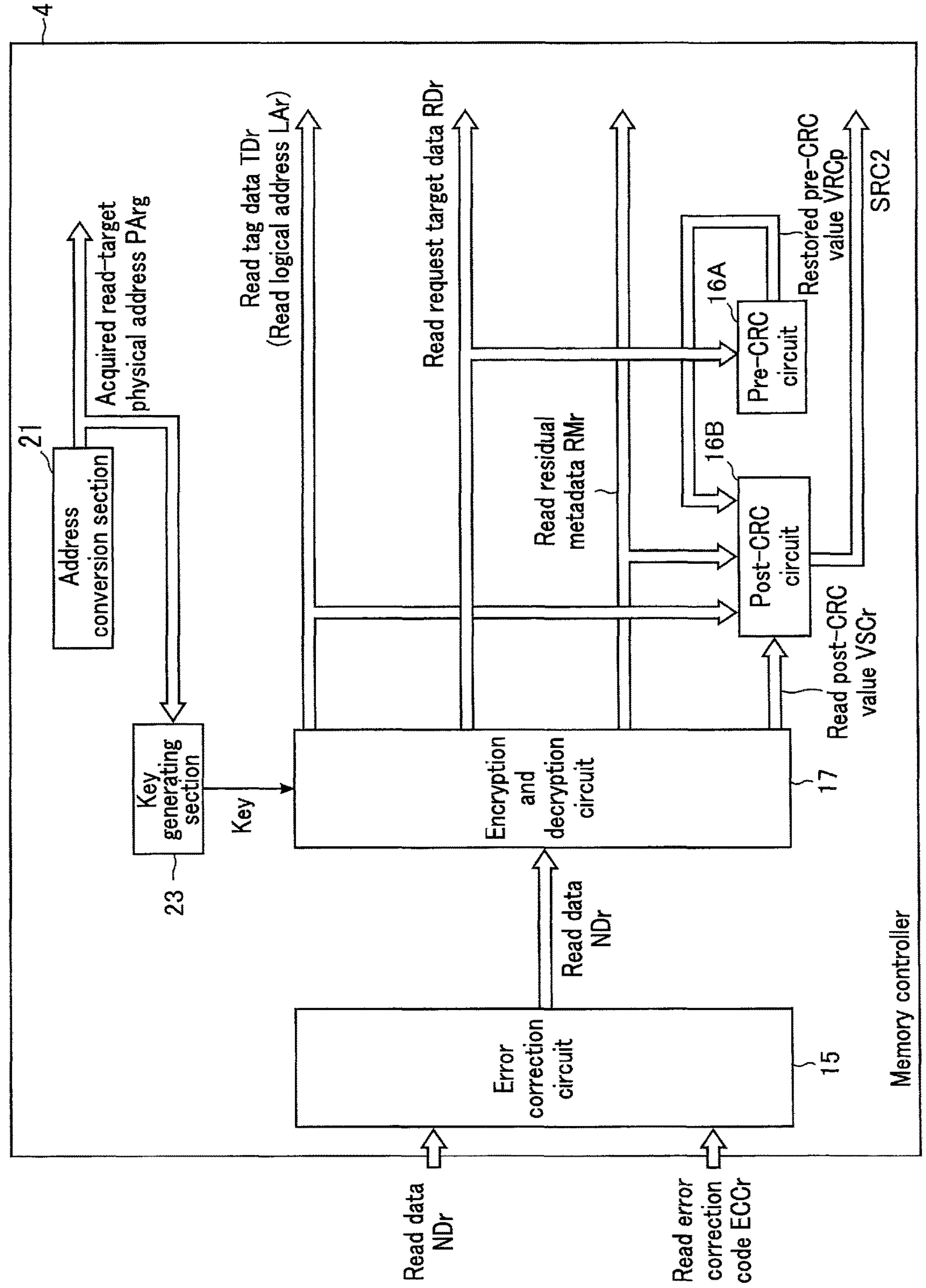
FIG. 11 shows a flow of data in data copying in the memory system according to the first embodiment.
Figure 12:
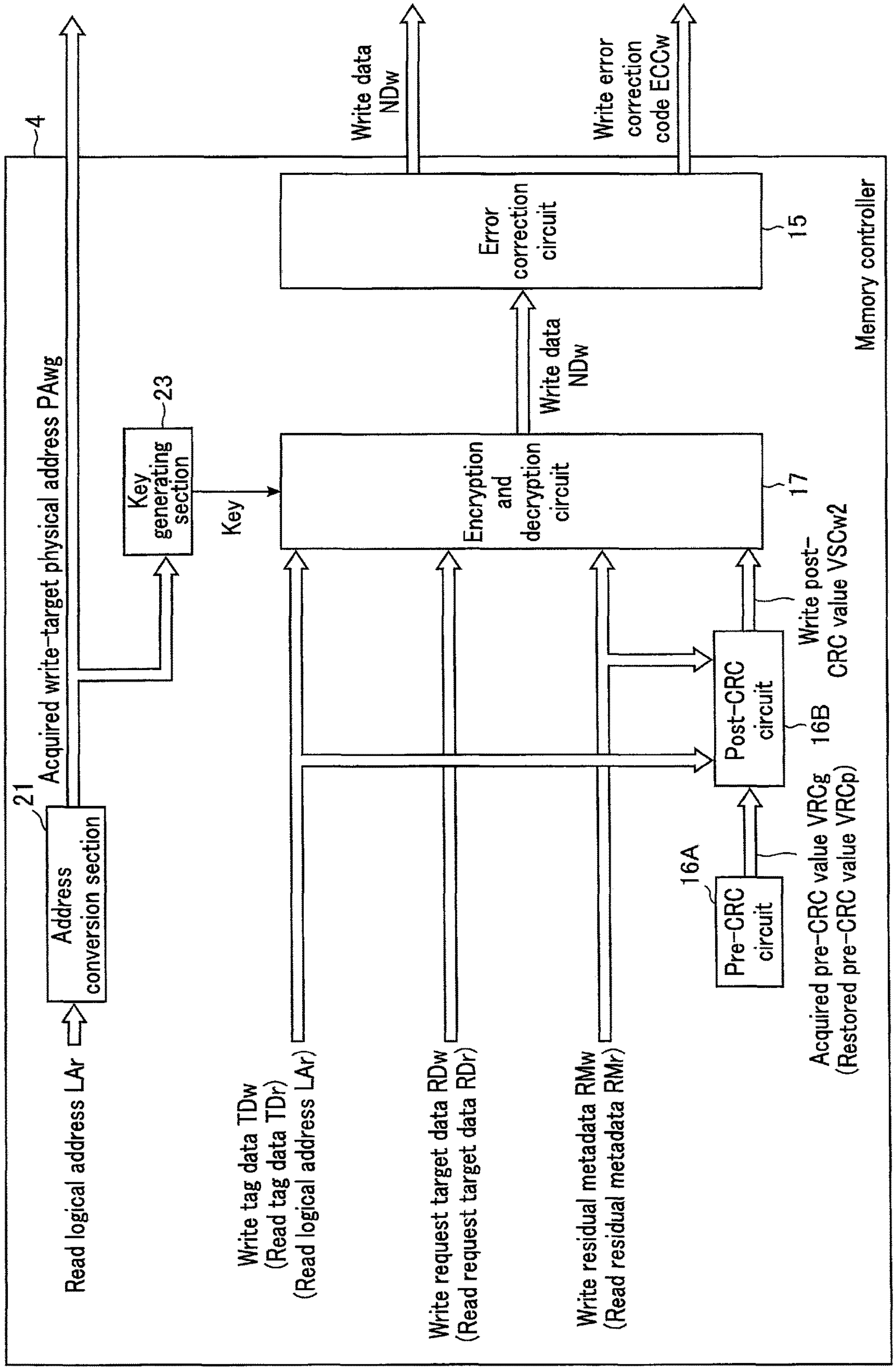
FIG. 12 shows a flow of data in data copying in the memory system according to the first embodiment.

FIGS. 11 and 12 show a flow of data in data copying in the memory system 1 according to the first embodiment. More specifically, FIGS. 11 and 12 show data acquired in data copying that is not accompanied by a host request, and a change and a flow of the acquired data. FIG. 12 shows a state that is subsequent to the state of FIG. 11. The state shown in FIG. 11 occurs when the memory system 1 determines to copy (or, move) data in the memory 5, and supplies, to the memory 5, a read command set indicating reading of data from an area specified by the acquired read-target physical address PArg, from which data is copied. An operation based on the read command set to be described below is similar to the data reading based on a read request. Hereinafter, a description will be given mainly of differences.

Upon receiving a read command set, the memory 5 reads data from an area specified by the acquired read-target physical address PArg, and acquires read data NDr and a read error correction code ECCr.

The read data NDr and the read error correction code ECCr are received by the error correction circuit 15. The error correction circuit 15 outputs read data NDr that does not contain an error, similarly to the data reading based on a read request.

The read data NDr is received by the encryption and decryption circuit 17. Similarly to the data reading based on a read request, the encryption and decryption circuit 17 decrypts the read data NDr, and generates read request target data RDr, a read logical address LAr, read residual metadata RMr, and a read post-CRC value VSCr. At this time, the key used by the encryption and decryption circuit 17 is generated by the key generating section 23 from, for example, the acquired read-target physical address PArg.

The read request target data RDr is received by the pre-CRC circuit 16A. The pre-CRC circuit 16A generates a restored pre-CRC value VRCp, similarly to the data reading based on a read request.

The restored pre-CRC value VRCp is received by the post-CRC circuit 16B. The post-CRC circuit 16B receives read residual metadata RMr, similarly to the data reading based on a read request. On the other hand, the post-CRC circuit 16B receives the read logical address LAr, unlike the data reading based on a read request. The post-CRC circuit 16B uses the read logical address LAr instead of the supplied read-target logical address LArg that is the case in data reading based on a read request. That is, the post-CRC circuit 16B acquires read post-CRC input data RSCI2 by concatenating the restored pre-CRC value VRCp, the read logical address LAr, and the read residual metadata RMr. By dividing the read post-CRC input data RSCI2 by the second generator polynomial, namely, by a post-CRC operation, the acquired post-CRC value VSCg2 is generated.

The acquired post-CRC value VSCg2 is the same as the read post-CRC value VSCr unless an unintentional error occurs during the period from the start of data reading until the acquisition of the acquired post-CRC value VSCg2. Moreover, the acquired post-CRC value VSCg2 is the same as the write post-CRC value VSCw when the acquired post-CRC value VSCg2 was written, unless an unintentional error occurs during the period from the start of data writing to the acquisition of the acquired post-CRC value VSCg2. If the acquired post-CRC value VSCg2 does not match the read post-CRC value VSCr, the post-CRC circuit 16B transmits a signal SRC2 indicating an error to the host device 2, and the memory system 1 stops the data copying.

If the acquired post-CRC value VSCg2 matches the read post-CRC value VSCr, the memory system 1 writes the read request target data RDr and the read residual metadata RMr to the memory 5. After the start of the writing, the written read request target data RDr and the read residual metadata RMr respectively function as write request target data RDw and write residual metadata RMw. The restored pre-CRC value VRCp functions as an acquired pre-CRC value VRCg in writing based on a write request. Writing is similar to writing based on a write request. A difference is that the read logical address LAr acquired in reading for data copying is used instead of write tag data TDw (i.e., supplied write-target logical address LAwg) that does not exist. Details will be described below.

As shown in FIG. 12, the address conversion section 21 determines an acquired write-target physical address PAwg of a block in the memory 5 into which write request target data RDw is to be written. The address conversion section 21 updates, in the address conversion table 31, a physical address associated with the read logical address LAr with the acquired write-target physical address PAwg.

The key generating section 23 generates a key (i.e., encryption key). For the key generation, the key generating section 23 is capable of using, for example, the acquired write-target physical address PAwg.

The post-CRC circuit 16B receives the read logical address LAr included in the write tag data TDw. The post-CRC circuit 16B further receives the acquired pre-CRC value VRCg and the write residual metadata RMw.

The post-CRC circuit 16B acquires write post-CRC input data WSCI2 by concatenating the received acquired pre-CRC value VRCg, the read logical address LAr, and the write residual metadata RMw. By dividing the write post-CRC input data WSCI2 by the second generator polynomial, namely, by a post-CRC operation, a write post-CRC value VSCw2 is generated.

The encryption and decryption circuit 17 encrypts the read logical address LAr, the write request target data RDw, the write residual metadata RMw, and the write post-CRC value VSCw2, and thereby generates write data NDw, similarly to the data writing based on a write request.

The error correction circuit 15 generates a write error correction code ECCw from write data NDw, similarly to the data writing based on a write request. The write data NDw and the write error correction code ECCw are written into an area in the memory area of the memory 5 that is specified by the acquired write-target physical address PAwg.

1.2.5.1. CRC Value Acquired and Generated Based on Data Copying

Figure 13:
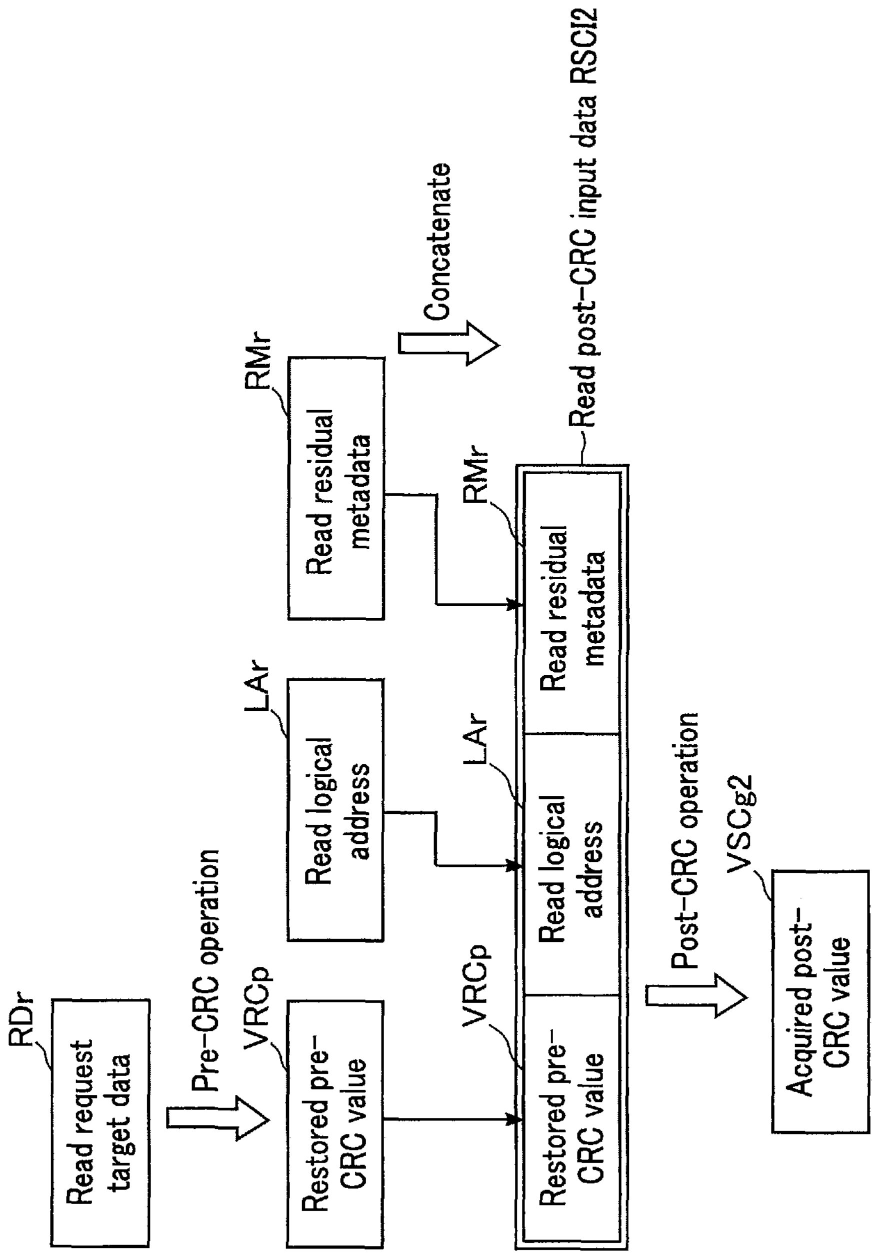
FIG. 13 shows some CRC values acquired and generated during data copying in the memory system according to the first embodiment.
Figure 14:
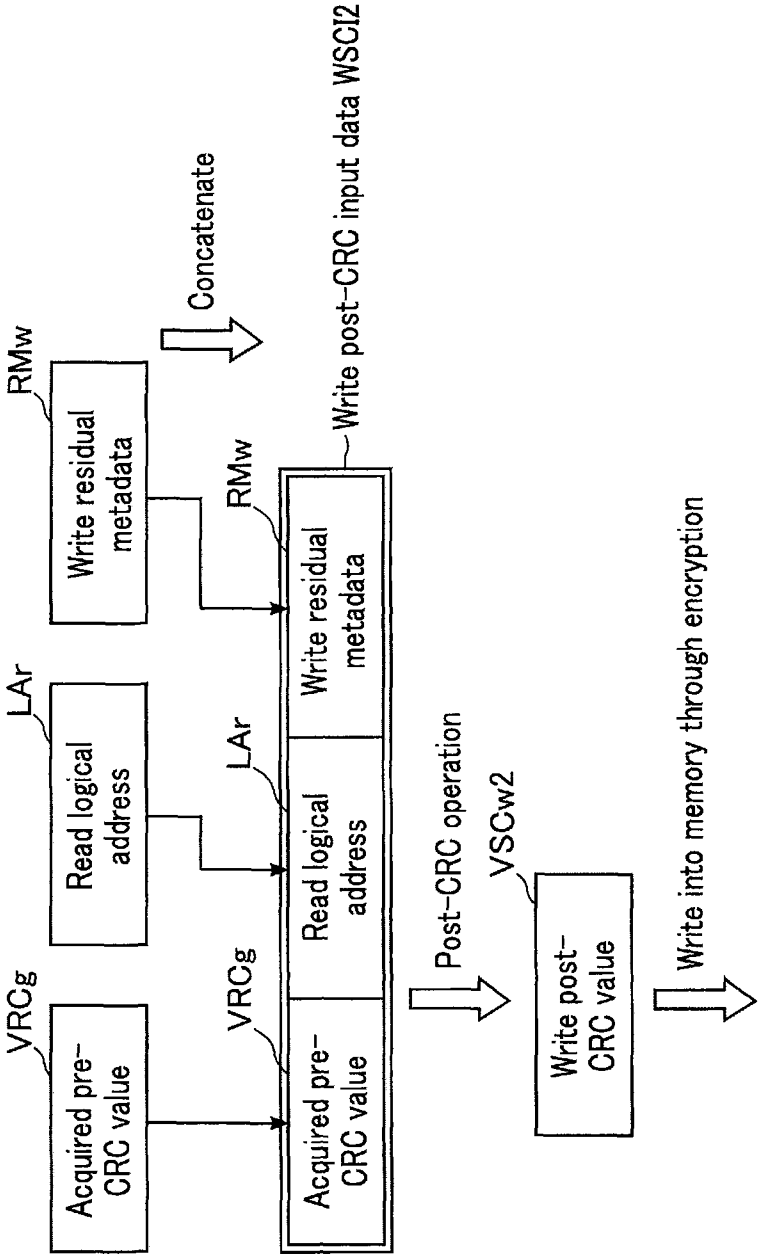
FIG. 14 shows some CRC values acquired and generated during data copying in the memory system according to the first embodiment.

FIGS. 13 and 14 show some CRC values acquired and generated during data copying in the memory system 1 according to the first embodiment. FIG. 14 shows a state that is subsequent to the state of FIG. 13.

As described with reference to FIG. 11 and as shown in FIG. 13, by dividing the value of the read request target data RDr by the first generator polynomial, namely, by a pre-CRC operation, a restored pre-CRC value VRCp is generated.

In the post-CRC circuit 16B, the restored pre-CRC value VRCp is concatenated with the read logical address LAr and the read residual metadata RMr, and thereby read post-CRC input data RSCI2 is generated. The components that are concatenated in the read post-CRC input data RSCI2 may be in any order as long as such an order matches the order of the corresponding components in the write post-CRC input data WSCI generated when the read request target data RDr was written. That is, the restored pre-CRC value VRCp, the read logical address LAr, and the read residual metadata RMr respectively correspond to the acquired pre-CRC value VRCg, the supplied write-target logical address LAwg, and the write residual metadata RMw in the write post-CRC input data WSCI. Based thereon, an ordinal rank of the restored pre-CRC value VRCp in the read post-CRC input data RSCI2 is the same as an ordinal rank of the acquired pre-CRC value VRCg in the write post-CRC input data WSCI. An ordinal rank of the read logical address LAr in the read post-CRC input data RSCI2 is the same as an ordinal rank of the supplied write-target logical address LAwg in the write post-CRC input data WSCI. An ordinal rank of the read residual metadata RMr in the read post-CRC input data RSCI2 is the same as an ordinal rank of the write residual metadata RMw in the write post-CRC input data WSCI.

By dividing the value of the read post-CRC input data RSCI2 by the second generator polynomial, namely, by a post-CRC operation, an acquired post-CRC value VSCg2 is generated.

As described with reference to FIG. 12 and as shown in FIG. 14, in the post-CRC circuit 16B, the acquired pre-CRC value VRCg (i.e., a restored pre-CRC value VRCp) is concatenated with the read logical address LAr and the write residual metadata RMw, and thereby write post-CRC input data WSCI2 is generated. The components that are concatenated in the write post-CRC input data WSCI2 may be in any order as long as such an order matches the order of the corresponding components in the read post-CRC input data RSCI2. That is, the acquired pre-CRC value VRCg, the read logical address LAr, and the write residual metadata RMw respectively correspond to the restored pre-CRC value VRCp, the read logical address LAr, and the read residual metadata RMr in the read post-CRC input data RSCI2. Based thereon, an ordinal rank of the acquired pre-CRC value VRCg in the write post-CRC input data WSCI2 is the same as an ordinal rank of the restored pre-CRC value VRCp in the read post-CRC input data RSCI2. An ordinal rank of the read logical address LAr in the write post-CRC input data WSCI2 is the same as an ordinal rank of the read logical address LAr in the read post-CRC input data RSCI2. An ordinal rank of the write residual metadata RMw in the write post-CRC input data WSCI2 is the same as an ordinal rank of the read residual metadata RMr in the read post-CRC input data RSCI2.

By dividing the value of the write post-CRC input data WSCI2 by the second generator polynomial, namely, by a post-CRC operation, a write post-CRC value VSCw2 is generated. The write post-CRC value VSCw2 is generated using the write post-CRC input data WSCI2 as a dividend, and the write post-CRC input data WSCI2 includes an acquired pre-CRC value VRCg and a read logical address LAr. Thus, the write post-CRC value VSCw2 reflects the acquired pre-CRC value VRCg and the read logical address LAr.

The write post-CRC value VSCw2 is supplied to the encryption and decryption circuit 17. On the other hand, the acquired pre-CRC value VRCg is not supplied to the encryption and decryption circuit 17. Accordingly, the acquired pre-CRC value VRCg is not included in the write data NDw, and is not written into the memory 5.

1.3. Advantages (Advantageous Effects)

According to the first embodiment, it is possible to provide a memory system 1 capable of accurately reading data, as will be described below.

The memory system 101 for reference includes a memory controller 104 and a memory 5. Of the components included in the memory controller 4, the memory controller 104 includes a pre-CRC circuit 116A and a post-CRC circuit 116B, instead of the pre-CRC circuit 16A and the post-CRC circuit 16B, respectively.

The memory controller 104 writes a supplied CRC value VTC into the memory 5. Writing of the supplied CRC value VTC into the memory 5 may be defined by, for example, a communication standard with which the host interface 11 is compliant. When the supplied CRC value VTC is written into the memory 5, in a standard that defines writing of the supplied CRC value VTC into the memory 5, in particular, the supplied CRC value VTC is not supplied to the post-CRC circuit 116B. The post-CRC circuit 116B performs a post-CRC operation on the write tag data TDw and the write residual metadata RMw, and thereby generates a post-CRC value VSCQ. The post-CRC value VSCQ is written into the memory 5. Accordingly, both the supplied CRC value VTC and the post-CRC value VSCQ are written as CRC values.

According to the first embodiment, a post-CRC operation is generated using write post-CRC input data WSCI including an acquired pre-CRC value VRCg (i.e., a supplied CRC value VTC) as a dividend, and the obtained write post-CRC value VSCw is written into the memory 5, whereas the acquired pre-CRC value VRCg is not written into the memory 5. Thus, for writing of write request target data RDw, two kinds of CRC values, namely, both the supplied CRC value VTC and the post-CRC value VSCQ, are not written, unlike the memory system 101 for reference. This means that the amount of data (e.g., tag data and/or metadata) that is appended at the time of writing of write request target data RDw is smaller in the memory system 1 than in the memory system 101. Thus, if the memory 5 of the memory system 1 and the memory 5 of the memory system 101 have the same storage capacity, the amount of data that can be written into the memory system 1 is larger than the amount of data that can be written into the memory system 101.

Alternatively, when the memory system 1 and the memory system 101 include a memory 5 with the same storage capacity and are permitted to write the same amount of appendix data in response to writing of write request target data RDw, a larger amount of appendix data can be written into the memory system 1 than the memory system 101 in response to the write request target data RDw. By making appendix data of an amount larger than that in the memory system 101 an error correction code, the memory system 1 is capable of realizing error correction with higher precision than the memory system 101. That is, the memory system 1 is capable of reading data more accurately than the memory system 101.

In the memory system 1, the acquired pre-CRC value VRCg is not written into the memory 5. Instead, the acquired pre-CRC value VRCg is included in the dividend of the post-CRC operation. Thus, the value of the acquired pre-CRC value VRCg is reflected in the write post-CRC value VSCw. In response to a read request, a restored pre-CRC value VRCp is yielded, read post-CRC input data RSCI including the restored pre-CRC value VRCp is yielded, and the read post-CRC input data RSCI and the read post-CRC value VSCr are compared. The read post-CRC input data RSCI and the read post-CRC value VSCr are the same unless an error occurs. Accordingly, it is possible to correctly read the read request target data RDr with high precision through confirmation of the match between the read post-CRC input data RSCI and the read post-CRC value VSCr.

1.4. Modification

The above description relates to an example in which the CRC circuit 16 includes two CRC sub circuits, namely, a pre-CRC circuit 16A and a post-CRC circuit 16B. The CRC circuit 16 may be a single CRC circuit, without including such a CRC sub circuit. In this case, the CRC circuit 16 is configured in such a manner that a result in the middle of a CRC operation can be used as part of an input of another CRC operation. That is, the CRC circuit 16 acquires first check data SCD1 by dividing the first CRC input data CRI1 by the first generator polynomial, as shown in FIG. 4.

The CRC circuit 16 compares the value of the first check data SCD1 with the value of the second CRC input data CRI2. If the value of the first check data SCD1 and the value of the second CRC input data CRI2 do not match, the CRC circuit 16 outputs a signal SRC1 indicating the mismatch, and ends a process that uses the first CRC input data CRI1 as an input.

If the value of the first check data SCD1 and the value of the second CRC input data CRI2 match, the CRC circuit 16 concatenates the first check data SCD1 with the third CRC input data CRI3, and thereby acquires fourth CRC input data CRI4.

The CRC circuit 16 acquires second check data SCD2 through division of the value of the fourth CRC input data CRI4 by the second generator polynomial.

The CRC circuit 16 compares the value of the second check data SCD2 with the value of the fifth CRC input data CRI5. If the value of the second check data SCD2 and the value of the fifth CRC input data CRI5 do not match, the post-CRC circuit 16B outputs a signal SRC2 indicating the mismatch, and ends a process that uses the third CRC input data CRI3 as an input.

If the value of the second check data SCD2 and the value of the fifth CRC input data CRI5 match, the CRC circuit 16 outputs the second check data SCD2.

2. Second Embodiment

The second embodiment is used in addition to the first embodiment. In the second embodiment, additional information is used in a post-CRC operation. Hereinafter, a description will be given mainly of differences from the first embodiment.

2.1. Configuration

The memory system 1 of the second embodiment has the same components with the same couplings as those of the memory system 1 of the first embodiment. However, in the memory system 1 of the second embodiment, the operation of the memory controller 4 differs from the operation of the memory controller 4 of the first embodiment. Specifically, some of the components in the memory controller 4 receive data different from that of the first embodiment. The memory controller 4 is configured, for example, to supply data, as will be described below. Specifically, firmware in the ROM 13 is configured to cause the memory controller 4 and associated components to perform an operation to be described below. Hereinafter, each component of the second embodiment may be referred to by a reference numeral with "b" at the end, in distinction from the corresponding component of the first embodiment. For example, the memory system 1 of the second embodiment may be referred to as a "memory system 1*b*".

2.2. Operation 2.2.1. Operation Based on Write Request

Figure 15:
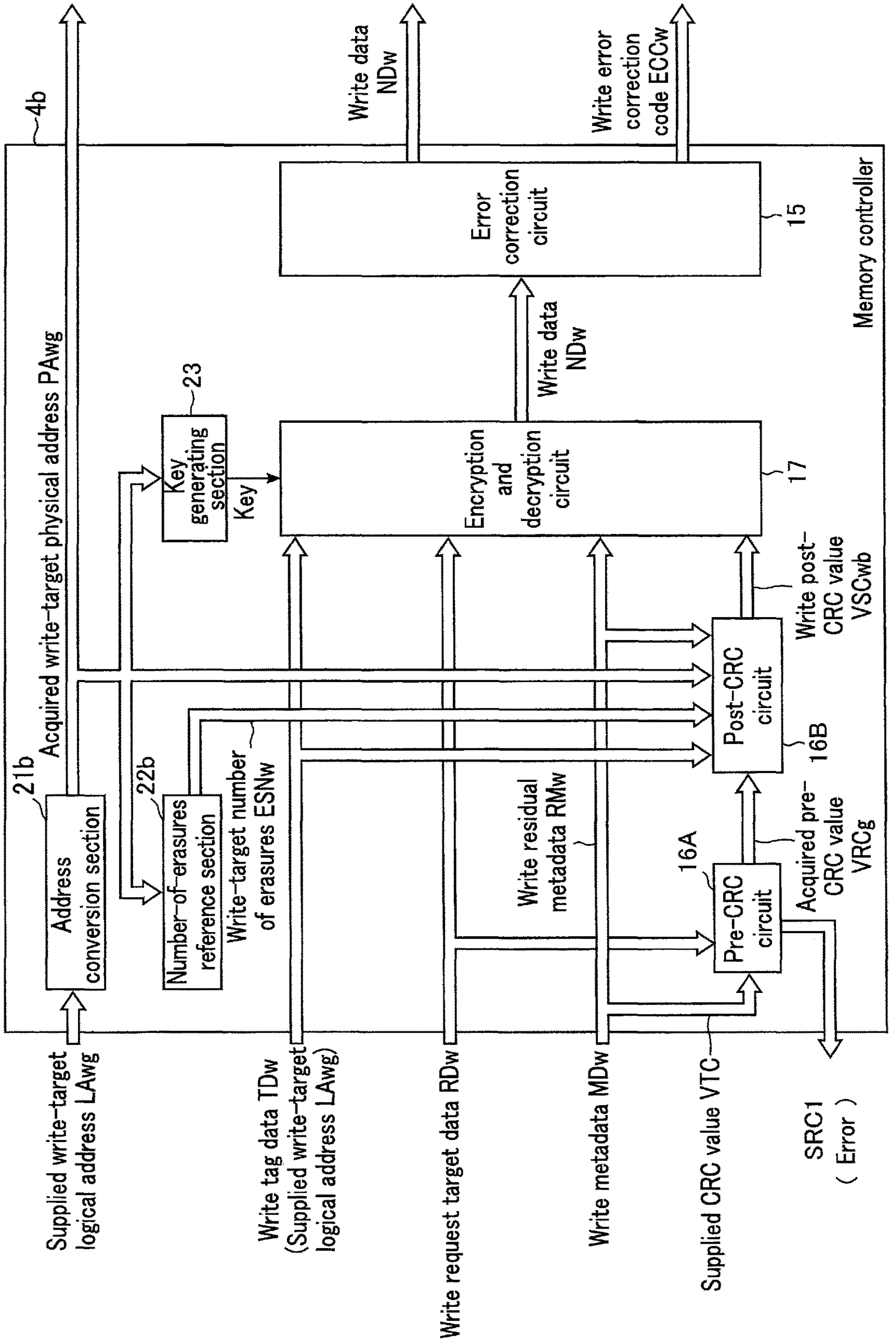
FIG. 15 shows a flow of data based on a data write request from a host device in a memory system according to a second embodiment.

FIG. 15 shows a flow of data based on a data write request from the host device 2 in the memory system 1*b* according to the second embodiment. More specifically, FIG. 15 shows data received based on a write request, and a change and a flow of the received data. The state shown in FIG. 7 occurs when the memory system 1*b* receives, from the host device 2, a write request command, write request target data, and write metadata MDw.

As shown in FIG. 15, the acquired write-target physical address PAwg is received by the number-of-erasures reference section 22. The number-of-erasures reference section 22 outputs a number of erasures ESN of the acquired write-target physical address PAwg, with reference to the number-of-erasures table 32. Hereinafter, the number of erasures ESN of the acquired write-target physical address PAwg may be referred to as a write-target number of erasures ESNw.

The write-target number of erasures ESNw is received by the post-CRC circuit 16B. The post-CRC circuit 16B also receives the acquired write-target physical address PAwg. The post-CRC circuit 16B concatenates an acquired pre-CRC value VRCg, a supplied write-target logical address LAwg, write residual metadata RMw, an acquired write-target physical address PAwg, and a write-target number of erasures ESNw. A bit string formed by the concatenation may be hereinafter referred to as "write post-CRC input data WSCIb". The post-CRC circuit 16B generates a remainder through a CRC operation on the value of the write post-CRC input data WSCIb using the second generator polynomial. That is, the post-CRC circuit 16B performs a post-CRC operation on the value of the write post-CRC input data WSCIb. The obtained post-CRC value may be referred to as a write post-CRC value VSCwb.

The encryption and decryption circuit 17 encrypts the supplied write-target logical address LAwg, write request target data RDw, write residual metadata RMw, and write post-CRC value VSCwb, and thereby generates write data NDw. The error correction circuit 15 generates a write error correction code ECCw from the write data NDw. The memory interface 18 writes the write data NDw and the write error correction code ECCw into an area of the memory area of the memory 5 that is specified by the acquired write-target physical address PAwg.

2.2.1.1. CRC Values Acquired and Generated based on Write Request

FIG. 16 shows some CRC values acquired and generated during data writing in the memory system 1*b* according to the second embodiment.

As described with reference to FIG. 16 and as shown in FIG. 15, by dividing the value of the write request target data RDw by the first generator polynomial, namely, by a pre-CRC operation, an acquired pre-CRC value VRCg is generated.

In the post-CRC circuit 16B, the acquired pre-CRC value VRCg is concatenated with the supplied write-target logical address LAwg, the write residual metadata RMw, the acquired write-target physical address PAwg, and the write-target number of erasures ESNw, and thereby write post-CRC input data WSCIb is generated. The acquired pre-CRC value VRCg, the supplied write-target logical address LAwg, the write residual metadata RMw, the acquired write-target physical address PAwg, and the write-target number of erasures ESNw in the write post-CRC input data WSCIb may be in any order as long as they are fixed in any concatenation.

By dividing the value of the write post-CRC input data WSCIb by the second generator polynomial, namely, by a post-CRC operation, a write post-CRC value VSCwb is generated. The write post-CRC value VSCwb is generated using the write post-CRC input data WSCIb as a dividend, and the write post-CRC input data WSCIb includes the acquired pre-CRC value VRCg, the supplied write-target logical address LAwg, the acquired write-target physical address PAwg, and the write-target number of erasures ESNw. Thus, the write post-CRC value VSCwb reflects the acquired pre-CRC value VRCg, the supplied write-target logical address LAwg, the acquired write-target physical address PAwg, and the write-target number of erasures ESNw.

The write post-CRC value VSCwb is supplied to the encryption and decryption circuit 17. On the other hand, the acquired pre-CRC value VRCg and the supplied CRC value VTC are not supplied to the encryption and decryption circuit 17. Accordingly, the acquired pre-CRC value VRCg and the supplied CRC value VTC are not included in the write data NDw, and are not written into the memory 5.

2.2.2. Operation based on Read Request

FIG. 17 shows a flow of data based on a data read request from the host device in the memory system 1*b* according to the second embodiment. More specifically, FIG. 17 shows data received based on a read request, and a change and a flow of the received data. The state shown in FIG. 17 occurs when the memory system 1*b* receives, from the host device 2, a read request command.

The description given below is based on an example in which the supplied read-target logical address LArg is the same as the supplied write-target logical address LAwg when the read request target data RDr was written.

As shown in FIG. 17, the supplied read-target logical address LArg is received by the address conversion section 21. The address conversion section 21 obtains, with reference to the address conversion table 31, a physical address associated with the supplied read-target logical address LArg, namely, an acquired read-target physical address PArg. The acquired read-target physical address PArg is the same as the acquired write-target physical address PAwg unless an unintentional error occurs during the period from the reception of the data read request until the acquisition of the acquired read-target physical address PArg.

The acquired read-target physical address PArg is received by the number-of-erasures reference section 22. The number-of-erasures reference section 22 outputs, with reference to the number-of-erasures table 32, a number of erasures ESN of the acquired read-target physical address PArg. Hereinafter, the number of erasures ESN of the acquired read-target physical address PArg may be referred to as a "read-target number of erasures ESNr".

The memory interface 18 reads data from an area of the memory area of the memory 5 that is specified by the acquired read-target physical address PArg. Read data NDr and a read error correction code ECCr are obtained through the data reading.

The read data NDr and the read error correction code ECCr are received by the error correction circuit 15. The error correction circuit 15 outputs read data NDr that does not contain an error, similarly to the data reading based on a read request.

The read data NDr is received by the encryption and decryption circuit 17. The encryption and decryption circuit 17 decrypts read data NDr, and generates read request target data RDr, a read logical address LAr, read residual metadata RMr, and a read post-CRC value VSCr.

The post-CRC circuit 16B receives the restored pre-CRC value VRCp, the supplied read-target logical address LArg, the read residual metadata RMr, the acquired read-target physical address PArg, and the read-target number of erasures ESNr. The read-target number of erasures ESNr is the same as the write-target number of erasures ESNw unless an unintentional error occurs during the period from the reception of the data read request until the acquisition of the read-target number of erasures ESNr. The post-CRC circuit 16B acquires read post-CRC input data RSCIb through concatenation of the restored pre-CRC value VRCp, the supplied read-target logical address LArg, the read residual metadata RMr, the acquired read-target physical address PArg, and the read-target number of erasures ESNr. The post-CRC circuit 16B generates a post-CRC value by dividing the value of the read post-CRC input data RSCIb by the second generator polynomial. The generated post-CRC value is referred to as an acquired post-CRC value VSCgb.

The post-CRC circuit 16B further receives the read post-CRC value VSCrb. The post-CRC circuit 16B compares the acquired post-CRC value VSCgb with the read post-CRC value VSCrb. The acquired post-CRC value VSCgb is the same as the read post-CRC value VSCrb unless an unintentional error occurs during the period from the reception of the data read request until the acquisition of the acquired post-CRC value VSCgb. The acquired post-CRC value VSCgb is the same as the read post-CRC value VSCrb unless an unintentional error occurs during the period from the reception of the data read request until the acquisition of the acquired post-CRC value VSCgb. Moreover, the acquired post-CRC value VSCgb is the same as the write post-CRC value VSCwb unless an unintentional error occurs during the period from the reception of the data write request until the acquisition of the acquired post-CRC value VSCgb. When the acquired post-CRC value VSCgb does not match the read post-CRC value VSCrb, the post-CRC circuit 16B transmits, via the host interface 11, a signal SRC2 indicating an error to the host device 2.

If the acquired post-CRC value VSCgb matches the read post-CRC value VSCrb, the post-CRC circuit 16B transmits a signal SRC2 indicating that the check has been passed to the host interface 11.

Upon receiving the signal SRC2 indicating that the check has been passed, the host interface 11 transmits data to be described below to the host device 2. The host interface 11 transmits read request target data RDr to the host device 2. The host interface 11 transmits a read logical address LAr to the host device 2 as read tag data TDr. The host interface 11 generates read metadata MDr by concatenating the restored pre-CRC value VRCp and the read residual metadata RMr, and transmits the read metadata MDr to the host device 2.

2.2.2.1. CRC Value Acquired and Generated Based on Read Request

FIG. 18 shows some CRC values acquired and generated during data reading in the memory system 1 according to the second embodiment.

As described with reference to FIG. 17 and as shown in FIG. 18, by dividing the value of the read request target data RDr by the first generator polynomial, namely, by a pre-CRC operation, a restored pre-CRC value VRCp is generated.

In the post-CRC circuit 16B, the restored pre-CRC value VRCp is concatenated with the supplied read-target logical address LArg, the read residual metadata RMr, the acquired read-target physical address PArg, and the read-target number of erasures ESNr, and thereby read post-CRC input data RSCIb is generated. The components that are concatenated in the read post-CRC input data RSCIb may be in any order as long as such an order matches the order of corresponding components in the write post-CRC input data WSCIb. That is, the restored pre-CRC value VRCp, the supplied read-target logical address LArg, the read residual metadata RMr, the acquired read-target physical address PArg, and the read-target number of erasures ESNr respectively correspond to the acquired pre-CRC value VRCg, the supplied write-target logical address LAwg, the write residual metadata RMw, the acquired write-target physical address PAwg, and the write-target number of erasures ESNw in the write post-CRC input data WSCIb. Based thereon, an ordinal rank of the restored pre-CRC value VRCp in the read post-CRC input data RSCIb is the same as an ordinal rank of the acquired pre-CRC value VRCg in the write post-CRC input data WSCIb. An ordinal rank of the supplied read-target logical address LArg in the read post-CRC input data RSCIb is the same as an ordinal rank of the supplied write-target logical address LAwg in the write post-CRC input data WSCIb. An ordinal rank of the read residual metadata RMr in the read post-CRC input data RSCIb is the same as an ordinal rank of the write residual metadata RMw in the write post-CRC input data WSCIb. An ordinal rank of the acquired read-target physical address PArg in the read post-CRC input data RSCIb is the same as an ordinal rank of the acquired write-target physical address PAwg in the write post-CRC input data WSCIb. An ordinal rank of the read-target number of erasures ESNr in the read post-CRC input data RSCIb is the same as an ordinal rank of the write-target number of erasures ESNw in the write post-CRC input data WSCIb.

By dividing the value of the read post-CRC input data RSCIb by the second generator polynomial, namely, by a post-CRC operation, an acquired post-CRC value VSCgb is generated.

2.2.3. Data Copying

Figure 20:
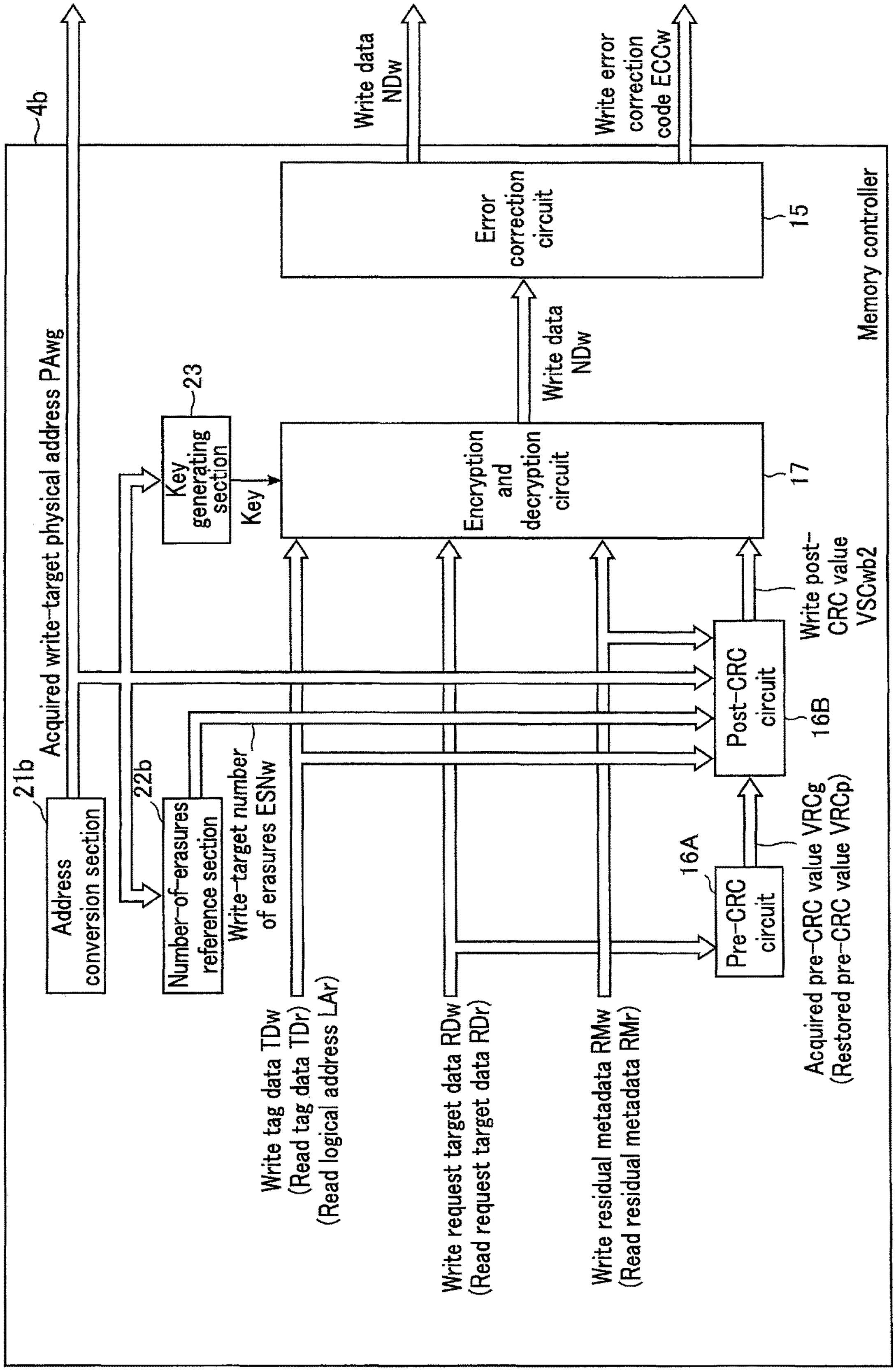
FIG. 20 shows a flow of data in data copying in the memory system according to the second embodiment.

FIGS. 19 and 20 show a flow of data in data copying in the memory system 1*b* according to the second embodiment. More specifically, FIGS. 19 and 20 show data acquired in data copying that is not accompanied by a host request, and a change and a flow of the acquired data. FIG. 20 shows a state that is subsequent to the state of FIG. 19. The state shown in FIG. 19 occurs when the memory system 1*b* determines to copy (or, move) data in the memory 5, and supplies, to the memory 5, a read command set indicating reading of data from an area specified by the acquired read-target physical address PArg, from which data is copied.

Upon receiving a read command set, the memory 5 reads data from an area specified by the acquired read-target physical address PArg, and acquires read data NDr and a read error correction code ECCr.

The read data NDr and the read error correction code ECCr are received by the error correction circuit 15. The error correction circuit 15 outputs read data NDr that does not contain an error, similarly to the data reading based on a read request.

The read data NDr is received by the encryption and decryption circuit 17. Similarly to the data reading based on a read request, the encryption and decryption circuit 17 decrypts the read data NDr, and generates read request target data RDr, a read logical address LAr, read residual metadata RMr, and a read post-CRC value VSCrb.

The read request target data RDr is received by the pre-CRC circuit 16A. The pre-CRC circuit 16A generates a restored pre-CRC value VRCp, similarly to the data reading based on a read request.

The restored pre-CRC value VRCp is received by the post-CRC circuit 16B. Also, similarly to the data reading based on a read request, the post-CRC circuit 16B receives read residual metadata RMr, an acquired read-target physical address PArg, and a read-target number of erasures ESNr. On the other hand, the post-CRC circuit 16B receives the read logical address LAr, unlike the data reading based on a read request. The post-CRC circuit 16B uses the read logical address LAr instead of the supplied read-target logical address LArg that is the case in data reading based on a read request. That is, the post-CRC circuit 16B acquires read post-CRC input data RSCIb2 by concatenating the restored pre-CRC value VRCp, the read logical address LAr, the read residual metadata RMr, the acquired read-target physical address PArg, and the read-target number of erasures ESNr. By dividing the read post-CRC input data RSCIb2 by the second generator polynomial, namely, by a post-CRC operation, an acquired post-CRC value VSCgb2 is generated.

The acquired post-CRC value VSCgb2 is the same as the read post-CRC value VSCrb unless an unintentional error occurs during the period from the start of data reading until the acquisition of the acquired post-CRC value VSCgb2. Moreover, the acquired post-CRC value VSCgb2 is the same as the write post-CRC value VSCwb when the acquired post-CRC value VSCgb2 was written, unless an unintentional error occurs during the period from the start of data writing to the acquisition of the acquired post-CRC value VSCgb2. If the acquired post-CRC value VSCg2*b* does not match the read post-CRC value VSCrb, the post-CRC circuit 16B transmits a signal SRC2 indicating an error to the host device 2, and the memory system 1*b* stops the data copying.

If the acquired post-CRC value VSCg2*b* matches the read post-CRC value VSCrb, the memory system 1*b* writes the read request target data RDr and the read residual metadata RMr into the memory 5. After the start of the writing, the written read request target data RDr and the read residual metadata RMr respectively function as write request target data RDw and write residual metadata RMw. The restored pre-CRC value VRCp functions as an acquired pre-CRC value VRCg in writing based on a write request. Writing is similar to writing based on a write request. A difference is that the read logical address LAr acquired in reading for data copying is used instead of write tag data TDw (i.e., supplied write-target logical address LAwg) that does not exist.

As shown in FIG. 20, the post-CRC circuit 16B receives the read logical address LAr included in the write tag data TDw. The post-CRC circuit 16B further receives the acquired pre-CRC value VRCg, the write residual metadata RMw, the acquired write-target physical address PAwg, and the write-target number of erasures ESNw.

The post-CRC circuit 16B acquires write post-CRC input data WSCIb2 by concatenating the received acquired pre-CRC value VRCg, the read logical address LAr, the write residual metadata RMw, the acquired write-target physical address PAwg, and the write-target number of erasures ESNw. By dividing the write post-CRC input data WSCIb2 by the second generator polynomial, namely, by a post-CRC operation, a write post-CRC value VSCwb2 is generated.

The encryption and decryption circuit 17 encrypts the read logical address LAr, the write request target data RDw, the write residual metadata RMw, and the write post-CRC value VSCwb2, and thereby generates write data NDw, similarly to the data writing based on a write request.

The error correction circuit 15 generates a write error correction code ECCw from write data NDw, similarly to data writing based on a write request. The write data NDw and the write error correction code ECCw are written into an area in the memory area of the memory 5 that is specified by the acquired write-target physical address PAwg.

2.2.3.1. CRC Value Acquired and Generated Based on Data Copying

FIGS. 21 and 22 show some CRC values acquired and generated during data copying in the memory system 1*b* according to the second embodiment. FIG. 22 shows a state that is subsequent to the state of FIG. 21.

As described with reference to FIG. 19 and as shown in FIG. 21, by dividing the value of the read request target data RDr by the first generator polynomial, namely, by a pre-CRC operation, a restored pre-CRC value VRCp is generated.

In the post-CRC circuit 16B, the restored pre-CRC value VRCp is concatenated with the read logical address LAr, the read residual metadata RMr, the acquired read-target physical address PArg, and the read-target number of erasures ESNr, and thereby read post-CRC input data RSCIb2 is generated. The components that are concatenated in the read post-CRC input data RSCIb2 may be in any order as long as such an order matches the order of the corresponding components in the write post-CRC input data WSCIb generated when the read request target data RDr was written. That is, the restored pre-CRC value VRCp, the read logical address LAr, the read residual metadata RMr, the acquired read-target physical address PArg, and the read-target number of erasures ESNr respectively correspond to the acquired pre-CRC value VRCg, the supplied write-target logical address LAwg, the write residual metadata RMw, the acquired write-target physical address PAwg, and the write-target number of erasures ESNw in the write post-CRC input data WSCIb. Based thereon, an ordinal rank of the restored pre-CRC value VRCp in the read post-CRC input data RSCIb2 is the same as an ordinal rank of the acquired pre-CRC value VRCg in the write post-CRC input data WSCIb. An ordinal rank of the read logical address LAr in the read post-CRC input data RSCIb2 is the same as an ordinal rank of the supplied write-target logical address LAwg in the write post-CRC input data WSCIb. An ordinal rank of the read residual metadata RMr in the read post-CRC input data RSCIb2 is the same as an ordinal rank of the write residual metadata RMw in the write post-CRC input data WSCIb. An ordinal rank of the acquired read-target physical address PArg in the read post-CRC input data RSCIb2 is the same as an ordinal rank of the acquired write-target physical address PAwg in the write post-CRC input data WSCIb. An ordinal rank of the read-target number of erasures ESNr in the read post-CRC input data RSCIb2 is the same as an ordinal rank of the write-target number of erasures ESNw in the write post-CRC input data WSCIb.

By dividing the value of the read post-CRC input data RSCIb2 by the second generator polynomial, namely, by a post-CRC operation, an acquired post-CRC value VSCgb2 is generated.

As described with reference to FIG. 20 and as shown in FIG. 22, in the post-CRC circuit 16B, the acquired pre-CRC value VRCg (i.e., a restored pre-CRC value VRCp) is concatenated with the read logical address LAr, the write residual metadata RMw, the acquired write-target physical address PAwg, and the write-target number of erasures ESNw, and thereby write post-CRC input data WSCIb2 is generated. The components that are concatenated in the write post-CRC input data WSCIb2 may be in any order as long as such an order matches the order of the corresponding components in the read post-CRC input data RSCIb2. That is, the acquired pre-CRC value VRCg, the read logical address LAr, the write residual metadata RMw, the acquired write-target physical address PAwg, and the write-target number of erasures ESNw respectively correspond to the restored pre-CRC value VRCp, the read logical address LAr, the read residual metadata RMr, the acquired read-target physical address PArg, and the read-target number of erasures ESNr in the read post-CRC input data RSCIb2. Based thereon, an ordinal rank of the acquired pre-CRC value VRCg in the write post-CRC input data WSCIb2 is the same as an ordinal rank of the restored pre-CRC value VRCp in the read post-CRC input data RSCIb2. An ordinal rank of the read logical address LAr in the write post-CRC input data WSCIb2 is the same as an ordinal rank of the read logical address LAr in the read post-CRC input data RSCIb2. An ordinal rank of the write residual metadata RMw in the write post-CRC input data WSCIb2 is the same as an ordinal rank of the read residual metadata RMr in the read post-CRC input data RSCIb2. An ordinal rank of the acquired write-target physical address PAwg in the write post-CRC input data WSCIb2 is the same as an ordinal rank of the acquired read-target physical address PArg in the read post-CRC input data RSCIb2. An ordinal rank of the write-target number of erasures ESNw in the write post-CRC input data. WSCIb2 is the same as an ordinal rank of the read-target number of erasures ESNr in the read post-CRC input data RSCIb2.

By dividing the value of the write post-CRC input data WSCIb2 by the second generator polynomial, namely, by a post-CRC operation, a write post-CRC value VSCwb2 is generated. The write post-CRC value VSCwb2 is generated using the write post-CRC input data WSCIb2 as a dividend, and the write post-CRC input data WSCIb2 includes the acquired pre-CRC value VRCg, the read logical address LAr, the acquired write-target physical address PAwg, and the write-target number of erasures ESNw. Thus, the write post-CRC value VSCwb2 reflects the acquired pre-CRC value VRCg, the read logical address LAr, the acquired write-target physical address PAwg, and the write-target number of erasures ESNw.

The write post-CRC value VSCwb2 is supplied to the encryption and decryption circuit 17. On the other hand, the acquired pre-CRC value VRCg is not supplied to the encryption and decryption circuit 17. Accordingly, the acquired pre-CRC value VRCg is not included in the write data NDw, and is not written into the memory 5.

2.3. Advantages (Advantageous Effects)

According to the second embodiment, similarly to the first embodiment, a post-CRC operation is generated using write post-CRC input data WSCI (or, write post-CRC input data WSCIb) including an acquired pre-CRC value VRCg (i.e., a supplied CRC value VTC) as a dividend, and the obtained write post-CRC value VSCw (i.e., write post-CRC input data WSCIb) is written into the memory 5, whereas the acquired pre-CRC value VRCg is not written into the memory 5. It is thus possible to achieve the same advantageous effects as those achieved by the first embodiment.

According to the second embodiment, it is possible to realize a memory system 1*b* capable of reading data with higher accuracy, as will be described below.

Some of the memory systems such as the memory system 1*b* manage the memory space of the memory 5 using an address system different from that of the host device. This requires a mechanism for conversion between the logical address, which is used by the host device, and the physical address, which is used by the memory system. If the conversion is erroneous, the obtained physical address would be incorrect, resulting in the read data being different from the data requested by the host device. Such erroneous conversion may occur from various causes. One such cause is an erroneous conversion at a conversion table such as the address conversion table 31. During the operation of the memory system, the conversion table is stored in the RAM of the memory system. When data with a logical address is written and a request to read data with the logical address is received, the physical address obtained by conversion from the logical address supplied upon writing should be the same as the physical address obtained by conversion from the logical address supplied upon reading. However, data stored in the RAM may be unintentionally changed to other data due to an error such as a soft error. This may cause the physical address obtained by conversion from the logical address supplied upon reading to be different from the physical address obtained by conversion of the logical address supplied upon writing.

According to the second embodiment, the post-CRC operation is performed using data containing a physical address as a dividend. That is, in data writing, an acquired write-target physical address PAwg is acquired from a supplied write-target logical address LAwg, a write post-CRC value VSCwb is generated using write post-CRC input data WSCIb containing the acquired write-target physical address PAwg as a dividend, and the write post-CRC value VSCwb is written into memory 5. In data reading, an acquired read-target physical address PArg is acquired from a supplied read-target logical address LArg, and an acquired post-CRC value VSCgb is generated using read post-CRC input data RSCIb containing the acquired read-target physical address PArg as a dividend. The acquired post-CRC value VSCgb is then compared with a read post-CRC value VSCrb.

The write post-CRC value VSCwb reflects the acquired write-target physical address PAwg, and the read post-CRC value VSCrb reflects the acquired read-target physical address PArg. When data with a particular logical address is written and a request to read the data with the logical address is received, the write post-CRC value VSCwb, and in turn the read post-CRC value VSCrb, should be the same as the acquired post-CRC value VSCgb. If they are the same, the acquired write-target physical address PAwg and the acquired read-target physical address PArg are also the same. It is thus possible to determine that the acquired write-target physical address PAwg and the acquired read-target physical address PArg match, based on the determination of a match between the read post-CRC value VSCrb and the acquired post-CRC value VSCgb. Accordingly, it is possible to suppress reading of erroneous data due to erroneous conversion of the logical address and the physical address.

Also, as described in the first embodiment, invalid data may be stored in some of the memory systems such as the memory system 1. In this case, pre-update (or, old) invalid data of a first logical address is stored in a first physical address, and post-update (or, latest) data (i.e., valid data) of the first logical address is stored in a second physical address. The first logical address is associated with the second physical address. There is a case, however, where the first logical address is erroneously determined to be associated with the first physical address, due to an unintentional phenomenon that is dependent on the address management method in the memory system. For example, there may be a case where a table on a RAM in the memory controller manages information as to whether valid data or invalid data is stored by the physical addresses, and a first physical address is determined as storing valid data due to a soft error in data in the table or shortage or connection failure of interconnects in the RAM. In such a case, old data is read in response to a request to read data with the first logical address. Error correction on the old data is performed correctly, since the data itself is not destroyed, and the old data is transmitted as a target for a read request. However, the old data is originally not data that the host device desires to acquire.

According to the second embodiment, a post-CRC operation is performed using, as a dividend, data containing the number of erasures of the data with a access-target physical address. That is, in data writing, a write-target number of erasures ESNw of an acquired write-target physical address PAwg is acquired, and a write post-CRC value VSCwb is generated using, as a dividend, write post-CRC input data WSCIb containing the write-target number of erasures ESNw, and the write post-CRC value VSCwb is written into the memory 5. In data reading, a read-target number of erasures ESNr of an acquired read-target physical address PArg is acquired, and an acquired post-CRC value VSCgb is generated using, as a dividend, read post-CRC input data RSCIb containing the read-target number of erasures ESNr. The acquired post-CRC value VSCgb is then compared with a read post-CRC value VSCrb.

The write post-CRC value VSCwb reflects the write-target number of erasures ESNw, and the read post-CRC value. VSCrb reflects the read-target number of erasures ESNr. When data with a particular logical address is written and a request to read the data with the logical address is received, the write post-CRC value VSCwb, and in turn the read post-CRC value VSCrb, should be the same as the acquired post-CRC value VSCgb. If they are the same, the write-target number of erasures ESNw and the read-target number of erasures ESNr are also the same. On the other hand, when a logical address is determined to be associated with a first physical address during writing and is determined to be associated with a second physical address during reading, the number of erasures of the first physical address and the number of erasures of the second physical address should be different. It is thus possible to determine that the acquired write-target physical address PAwg and the acquired read-target physical address PArg match, based on the determination of a match between the write-target number of erasures ESNw and the read-target number of erasures ESNr. Accordingly, it is possible to suppress reading of erroneous data due to erroneous conversion of the logical address and physical address.

2.4. Modification

An example has been described in which both a physical address and a number of erasures are contained in the dividend in the post-CRC operation during data writing and reading to and from the memory 5. However, only one of them may be used. That is, the write post-CRC input data WSCIb includes an acquired write-target physical address PAwg but does not include a write-target number of erasures ESNw, and the read post-CRC input data RSCIb includes an acquired read-target physical address PArg but does not include a read-target number of erasures ESNr. Alternatively, the write post-CRC input data WSCIb includes a write-target number of erasures ESNw but does not include an acquired write-target physical address PAwg, and the read post-CRC input data RSCIb includes a read-target number of erasures ESNr but does not include an acquired read-target physical address PArg. In data copying, the write post-CRC input data WSCIb2 includes an acquired write-target physical address PAwg and does not include a write-target number of erasures ESNw, and the read post-CRC input data RSCIb2 includes an acquired read-target physical address PArg but does not include a read-target number of erasures ESNr. Alternatively, the write post-CRC input data WSCIb2 includes a write-target number of erasures ESNw but does not include an acquired write-target physical address PAwg, and the read post-CRC input data RSCIb2 includes a read-target number of erasures ESNr but does not include an acquired read-target physical address PArg.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:

a memory; and a memory controller including an error detection code circuit configured to generate a first CRC (cyclic redundancy check) value from first data and generate a second CRC value from second data containing the first CRC value through an arithmetic operation using a generator polynomial, the memory controller being configured to:

encrypt the first data and the second CRC value by a first encryption to generate third data; and write the third data into the memory.

2. The memory system according to claim 1, wherein the memory controller is further configured to generate the second CRC value when a third CRC matches the first CRC value.

3. The memory system according to claim 2, wherein the memory controller is further configured to receive the first data and the third CRC value from outside the memory controller.

4. The memory system according to claim 3, wherein the third CRC value is based on the first data.

5. The memory system according to claim 4, wherein the first data is assigned a first logical address, and the second data contains the first CRC and the first logical address.

6. The memory system according to claim 1, wherein the memory controller is further configured to:
instruct the memory to read fourth data;
decrypt the fourth data by a first decryption to generate fifth data, the first decryption decrypting data encrypted by the first encryption;
generate a fourth CRC value from the fifth data; and
output the fifth data and the fourth CRC value.

7. The memory system according to claim 6, wherein the memory controller is further configured to instruct the memory to read the fourth data in response to a request to read the first data.

8. The memory system according to claim 6, wherein the first data is assigned a first logical address, and the memory controller is further configured to generate a fifth CRC value from sixth data containing the fourth CRC value and a second logical address.

9. The memory system according to claim 8, wherein the memory controller is further configured to:
decrypt the fifth data by the first decryption to generate a sixth CRC value; and
output the fifth data and the fourth CRC value when the fifth CRC value and the sixth CRC value match.

10. The memory system according to claim 8, wherein the memory controller is further configured to:
generate the second CRC value from the second data through a first arithmetic operation; and
generate the fifth CRC value from the sixth data through the first arithmetic operation.

11. The memory system according to claim 8, wherein the memory controller is further configured to:
write the third data into an area of a first physical address associated with the first logical address in the memory; and
read data from an area of the second physical address associated with the second logical address in the memory in response to a request to read the first data.

12. The memory system according to claim 11, wherein the first logical address is identical to the second logical address, and
the first physical address is identical to the second physical address.

13. The memory system according to claim 1, wherein the first data is assigned a first logical address,
the second data includes the first CRC value and the first logical address, and
the memory controller is further configured to:
instruct the memory to read fourth data; and
decrypt the fourth data by a first decryption to acquire the first data and a second logical address, the first decryption decrypting data encrypted by the-first encryption.

14. The memory system according to claim 1, wherein the error detection code circuit includes:
a first circuit configured to generate the first CRC value from the first data; and
a second circuit configured to generate the second CRC value from the second data.

15. The memory system according to claim 1, wherein the first data is assigned a first logical address,
the memory controller is further configured to write the third data into an area of a first physical address associated with the first logical address in the memory, and
the second data contains first information including at least one of the first physical address and information unique to the first physical address.

16. The memory system according to claim 15, wherein the memory controller is further configured to:
read fourth data from an area of a second physical address associated with a second logical address in the memory in response to a request to read the first data;
decrypt the fourth data by a first decryption to generate fifth data, the first decryption decrypting data encrypted by the first encryption;
generate a fourth CRC value from the fifth data; and
generate a fifth CRC value from sixth data containing the fourth CRC value and a second logical address,
the second data containing first information including at least one of the first physical address and the information unique to the first physical address, and
the sixth data further containing second information including at least one of the second physical address and information unique to the second physical address.

17. The memory system according to claim 16, wherein the information unique to the first physical address is a number of times data in an area of the first physical address has been erased since a first time, and
the information unique to the second physical address is a number of times data in an area of the second physical address has been erased since the first time.

18. The memory system according to claim 16, wherein the first logical address is identical to the second logical address, and
the first physical address is identical to the second physical address.

19. A memory system comprising:
a memory; and
a memory controller including an error detection code circuit configured to acquire first data and a first CRC (cyclic redundancy check) value generated from the first data, the memory controller being configured to:
generate second data by encrypting the first data by a first encryption; and
not write the first CRC value into the memory until completion of writing of the second data into the memory.

20. The memory system according to claim 19, wherein the memory controller further includes an encryption circuit and an error correction circuit,
the encryption circuit is configured to encrypt data supplied to the encryption circuit by the first encryption,
the error correction circuit is configured to add an error correction code to the encrypted data,
the first data is supplied to the encryption circuit, and
the first CRC value is not supplied to the encryption circuit.

* * * * *